United States Patent [19]

Morisawa et al.

[11] Patent Number: 4,792,012

[45] Date of Patent: Dec. 20, 1988

[54] ANTI TORQUE SHOCK CONTROL DEVICE AND METHOD ENGAGING TORQUE TRANSMITTING CLUTCH BETWEEN VEHICLE WHEELS WHEN TRANSMISSION IS SHIFTED FROM NON DRIVE RANGE TO DRIVE RANGE

[75] Inventors: Kunio Morisawa; Hideki Yasue; Kagenori Fukumura; Kenichi Yoshizawa; Yasunari Nakamura, all of Toyota, Japan

[73] Assignee: Toyota Jidosha Kabushiki Kaisha, Japan

[21] Appl. No.: 135,451

[22] Filed: Dec. 21, 1987

Related U.S. Application Data

[62] Division of Ser. No. 8,323, Jan. 29, 1987, Pat. No. 4,729,450.

[30] Foreign Application Priority Data

Jul. 25, 1987 [JP] Japan ................................. 61-176468

[51] Int. Cl.[4] ............................................. B60K 23/08
[52] U.S. Cl. ...................................... 180/247; 180/249; 192/3.52; 192/3.58; 364/424.1
[58] Field of Search ............... 180/249, 250, 247, 233; 74/711; 364/424.1; 192/0.033, 0.052, 0.075, 0.076, 3.51, 3.52, 3.58, 580

[56] References Cited

U.S. PATENT DOCUMENTS

3,910,388 10/1975 Moori et al. .................. 192/3.58 X
4,452,331 6/1984 Lunn et al. ......................... 180/247

*Primary Examiner*—John A. Pekar
*Attorney, Agent, or Firm*—Parkhurst, Oliff & Berridge

[57] ABSTRACT

A vehicle has at least two wheels, a transmission mechanism, and a clutch which can be selectively engaged to at least partially rotationally couple together these two wheels. This anti torque shock control device includes a means for detecting whether or not shift range of the transmission mechanism is a vehicle non driving range or a vehicle driving range, and a means for controlling the clutch to be at least partially engaged, when shift range of the transmission mechanism alters from a vehicle non driving range to a vehicle driving range. Thus torque shock and power train noise at this time are effectively prevented. The method of operation of this device is also described. In various applications, the clutch may be a switchover clutch for controlling the vehicle between two wheel drive operation and four wheel drive operation, selectively coupling between front wheels of the vehicle and rear wheels of the vehicle; or may be a central differential control clutch for controlling a central differential device of the vehicle between modes of operation in which the central differential device does and does not provide central differential effect between the front wheels of the vehicle and the rear wheels of the vehicle; or may be an axle differential control clutch for controlling a front or a rear differential device of the vehicle between modes of operation in which it does and does not provide differential effect between a pair of left and right wheels of the vehicle on the same axle.

4 Claims, 8 Drawing Sheets

ANTI TORQUE SHOCK CONTROL DEVICE AND METHOD ENGAGING TORQUE TRANSMITTING CLUTCH BETWEEN VEHICLE WHEELS WHEN TRANSMISSION IS SHIFTED FROM NON DRIVE RANGE TO DRIVE RANGE

This is a division of application Ser. No. 008,323 filed Jan. 29, 1987, now U.S. Pat. No. 4,279,450.

BACKGROUND OF THE INVENTION

The present invention relates to an anti torque shock control method and device for a power transmission system for a vehicle, and more particularly relates to such an anti torque shock control method and device, particularly applicable to a vehicle power transmission system in which a clutch is provided for selectively engaging two of the vehicle wheels together at least partially.

The present invention has been described in Japanese Patent Applications Ser. Nos. Showa 60-194634 (1985) and Showa 61-176468 (1986), both of which were filed by an applicant the same as the entity assigned or owed duty of assignment of the present patent application; and the present patent application hereby incorporates into itself by reference the text of said Japanese Patent Applications and the claims and the drawings thereof; copies are appended to the present application.

Nowadays a greatly increasing number of automotive vehicles are being constructed with four wheel drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice, or rain. One type of such transmission system is the so called part time four wheel drive system, in which a 2WD/4WD control clutch is included which can switch the transmission operational mode between a two wheel drive operational mode and a four wheel drive operational mode, i.e. typically which can selectively power the front wheels of the vehicle from the engine while the rear wheels of the vehicle are always being powered from said engine.

Also, there is currently sometimes provided a type of so called full time four wheel drive type of transmission which remains always engaged to four wheel drive without any episodes of two wheel driving, and this type is becoming more and more popular. In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front - rear differential device is provided in order to provide a differential action between said front vehicle wheels (considered as a pair) and said rear vehicle wheels (also considered as a pair) when the vehicle is turning around a curve, in order to eliminate the possibility of the occurrence of the so called tight corner braking phenomenon created by the difference in the turning radiuses of the front wheels of the vehicle and the rear wheels thereof. Also, it has been practiced to provide a device to such a front - rear differential device which prevents said front - rear differential device from performing differential action, in a selective fashion. When such a center differential action inhibition means, which typically may be a friction engaging means such as a hydraulic clutch, is actuated, it causes the differential action provided by said front - rear differential device between the front vehicle wheels and the rear vehicle wheels to be at least partially prevented, and instead said front vehicle wheels, considered as a pair, are driven from the vehicle engine, and also said rear vehicle wheels, considered as a pair, are at least partially independently driven from said vehicle engine. Such types of structure are at least partly disclosed, for example, in Japanese Patent Application Laying Open Publication Ser. No. 50-147027 (1975), Japanese Patent Application Laying Open Publication Serial No. 55-72420 (1980), Japanese Patent Application Laying Open Publication Ser. No. 56-138020 (1981), and Japanese Utility Model Application Laying Open Publication Serial No. 61-73430 (1986), none of which is it intended hereby to admit as prior art to the present patent application except to the extent in any case required by applicable law.

Also, there is a per se known type of so called limited slip differential device for a vehicle, not necessarily particularly associated with any four wheel drive transmission system, in which a differential device is provided for driving two vehicle wheels on the same vehicle axle with differential effect being provided therebetween, and in which a differential control clutch is provided to said differential device for selectively at least partially inhibiting said differential effect provided thereby.

Now, when a transmission for a vehicle is being used which has a fluid torque converter or a similar type of fluid coupling and also an auxiliary speed change mechanism such as an automatic transmission, the problem arises that, when the operating range of such a transmission is shifted from a non drive range such as "P" range or "N" range to a drive range such as "D" or "R" range, at this time drive force starts to be transmitted to certain vehicle drive wheels whereas before this was not the case, and this engenders a risk of slack in a differential device (either a front or a rear differential device, or a front/rear type of 4WD differential device) of the vehicle causing shift shock and so called "clonking", which not only is disconcerting and uncomfortable for passengers in the vehicle, but is liable to shorten the life of the transmission an/or the differential device, and to compromise their reliability.

Particularly with a four wheel drive type of vehicle, whether or not said be provided with a center differential device (i.e. a front/rear type of 4WD differential device), since it is typical in such a case for a rear differential device to be provided for providing differential effect between the two rear vehicle wheels and also for a front differential device to be provided for providing differential effect between the two front vehicle wheels, in this case when the operating range of the transmission is shifted from a non drive range such as "P" range or "N" range to a drive range such as "D" or "R" range, at this time one of these front and rear differential devices will typically have less slack and will take up drive first, whereupon the action of the central differential device will speed up the rotational motion of the other one of said front and rear differential devices, thus producing a relatively large shift shock or so called "clonking".

Further, in the event that such a front - rear differential device of the type described above is of an unequal distribution type which distributes drive torque substantially unequally between the front vehicle wheels and the rear vehicle wheels, then, when the operating range of the transmission is shifted from a non drive range such as "P" range or "N" range to a drive range such as "D" or "R" range, at this time the pair of vehicle wheels (typically the rear wheels) which receive more torque sink, or more properly the portion of the vehicle body above said pair of vehicle wheels drops, more than does the portion of the vehicle body above the other pair of vehicle wheels (typically the front wheels); and this causes the so called vehicle squat problem, which is troublesome and disconcerting for the vehicle passengers, and can lead to difficulties with vehicle steering and control. This problem further is accentuated in the case of a relatively soft vehicle suspension.

SUMMARY OF THE INVENTION

The inventors of the present invention have considered the various problems detailed above in the aforementioned case of shifting a vehicle transmission system from a non drive range operational mode to a drive range operational mode, from the point of view of the desirability of minimizing the torque shock at such a time.

Accordingly, it is the primary object of the present invention to provide an improved anti torque shock control method for a vehicle, and a corresponding device for implementing said method, which avoid the problems detailed above.

It is a further object of the present invention to provide such an anti torque shock control method and device, which are effective for a four wheel drive type vehicle transmission system.

It is a further object of the present invention to provide such an anti torque sock control method and device, which are effective for a full time four wheel drive type vehicle transmission system.

It is a yet further object of the present invention to provide such an anti torque shock control method and device, which are particularly effective, in the case that the vehicle front - rear differential device is of an unequal distribution type which distributes drive torque substantially unequally between the front vehicle wheels and the rear vehicle wheels.

It is a yet further object of the present invention to provide such an anti torque shock control method and device, which are effective for maximizing transmission life and reliability.

It is a yet further object of the present invention to provide such an anti torque shock control method and device, which prevent the occurrence of the vehicle squat phenomenon.

It is a yet further object of the present invention to provide such an anti torque shock control method and device, which maximize vehicle controllability.

According to the most general device aspect of the present invention, these and other objects are attained by, for a power transmission system for a vehicle comprising at least two wheels, a transmission mechanism, and a selectively engagable clutch for being selectively engaged to at least partially rotationally couple together said two vehicle wheels: an anti torque shock control device, comprising: (a) a means for detecting whether or not shift range of said transmission mechanism is a vehicle non driving range or a vehicle driving range; and: (b) a means for controlling said clutch to be at least partially engaged, when shift range of said transmission mechanism, as detected by said detecting means therefor, alters from a vehicle non driving range to a vehicle driving range; and, according to the most general method aspect of the present invention, these and other objects are attained by, for a four wheel drive power transmission system for a vehicle comprising at least two wheels, a transmission mechanism, and a selectively engagable clutch for being selectively engaged to at least partially rotationally couple together said two vehicle wheels: an anti torque shock control method, wherein: (a) it is detected whether or not shift range of said transmission mechanism is a vehicle non driving range or a vehicle driving range; and: (b) said clutch is controlled to be at least partially engaged, when shift range of said transmission mechanism, as thus detected, alters from a vehicle non driving range to a vehicle driving range.

The anti torque shock control device and method of the present invention, as specified above, are effective because thereby shift shock and so called "clonking" of the transmission and of any differentials included in the power train are reduced, as will be made clear from the descriptions of the preferred embodiments, given hereinafter.

The clutch may be a switchover clutch for controlling said vehicle between two wheel drive operation and four wheel drive operation, selectively coupling between front wheels of said vehicle and rear wheels of said vehicle; or it may be a central differential control clutch for controlling a central differential device of said vehicle between a mode of operation in which said central differential device provides central differential effect between front wheels of said vehicle and rear wheels of said vehicle, and a mode of operation in which said central differential device provides no such central differential effect between said front wheels of said vehicle and said rear wheels of said vehicle; or it may be an axle differential control clutch for controlling a differential device of said vehicle between a mode of operation in which said axle differential device provides differential effect between a pair of left and right wheels of said vehicle on the same axle, and a mode of operation in which said axle differential device provides no such differential effect between said same axle pair of left and right wheels of said vehicle. In either of the first two cases, the effect of the present invention is that during the shifting of the range of the transmission mechanism, in front to rear direct connection type four wheel drive operation, clonking of only one of the front and the rear differential devices of the vehicle is avoided, and thereby large shift shock and "clonking" are avoided. On the other hand, in the last case, the effect of the present invention is that during the shifting of the range of the transmission mechanism, since the differential device of the vehicle is locked up, thereby large shift shock and "clonking" are definitely and positively avoided.

Furthermore, in the case that such a central differential device is of an unequal distribution type which normally distributes drive torque substantially unequally between the front vehicle wheels and the rear vehicle wheels, then, since such a control clutch is according to the present invention engaged during the shifting of the range of the transmission mechanism, the drive torque is at this time distributed according to the load on the front and rear vehicle axles, thus avoiding the occurrence of the so called vehicle squat phenomenon when the range of the transmission mechanism is shifted from a non drive range to a drive range.

Further, according to an alternatively expressed device aspect of the present invention, the above specified objects and others are attained by, for a four wheel drive power transmission system for a vehicle comprising a pair of front wheels, a pair of rear wheels, an automatic transmission mechanism, and a central differential device comprising a selectively engagable central differential control clutch which can be selectively either disengaged or engaged respectively to either provide central differential effect between said front pair of vehicle wheels and said rear pair of vehicle wheels, with the torque distribution proportion then being provided to said rear pair of vehicle wheels being substantially greater than the torque distribution proportion then being provided to said front pair of vehicle wheels, or not to provide any such central differential effect between said front pair of vehicle wheels and said rear pair of vehicle wheels: an anti torque shock control device, comprising: (a) a means for detecting whether or not currently set shift range of said automatic transmission mechanism is a vehicle non driving range or a vehicle driving range; (b) a means for controlling said central differential control clutch to be at least partially engaged, when shift range of said transmission mechanism, as detected by said detecting means therefor, alters from a vehicle non driving range to a vehicle driving range; and: (c) a means for ensuring that, during a rapid vehicle start, said central differential control clutch is disengaged; and, according to an alternatively expressed method aspect of the present invention, the above specified objects and others are attained by, for a four wheel drive power transmission system for a vehicle comprising a pair of front wheels, a pair of rear wheels, an automatic transmission mechanism, and a central differential device comprising a selectively engagable central differential control clutch which can be selectively either disengaged or engaged respectively to either provide central differential effect between said front pair of vehicle wheels and said rear pair of vehicle wheels, with the torque distribution proportion then being provided to said rear pair of vehicle wheels being substantially greater than the torque distribution proportion then being provided to said front pair of vehicle wheels, or not to provide any such central differential effect between said front pair of vehicle wheels and said rear pair of vehicle wheels: an anti torque shock control method, wherein: (a) it is detected whether or not currently set shift range of said automatic transmission mechanism is a vehicle non driving range or a vehicle driving range; (b) said central differential control clutch is controlled to be at least partially engaged, when shift range of said transmission mechanism, as detected by said detecting means therefor, alters from a vehicle non driving range to a vehicle driving range; and: (c) it is ensured that, during a rapid vehicle start, said central differential control clutch is disengaged.

During sudden starting off of the vehicle, because of the sudden vehicle acceleration the effective weight imposed upon the rear vehicle axle is increased, and thus it is better to provide more torque to the rear vehicle wheels even if the vehicle squat phenomenon is thereby produced; and thus, according to the above described control device and method, although generally during shifting of the range of the transmission mechanism from a non drive range to a drive range the central differential device clutch should as described above be engaged in order to reduce vehicle squat, nevertheless during sudden starting off of the vehicle this engagement of said central differential device clutch should be eschewed, in order to aid with proper vehicle starting off.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and flow chart steps and so on in the various figures relating to one preferred embodiment, and like parts and gaps and spaces and flow chart steps and so on in figures relating to different preferred embodiments; and:

DESCRIPTION OF THE PREFERRED EMBODIMENTS

The present invention will now be described with reference to the preferred embodiments of the method and of the device thereof, and with reference to the figures.

First Exemplary Overall Vehicle Power Train Structure

Figure 1:
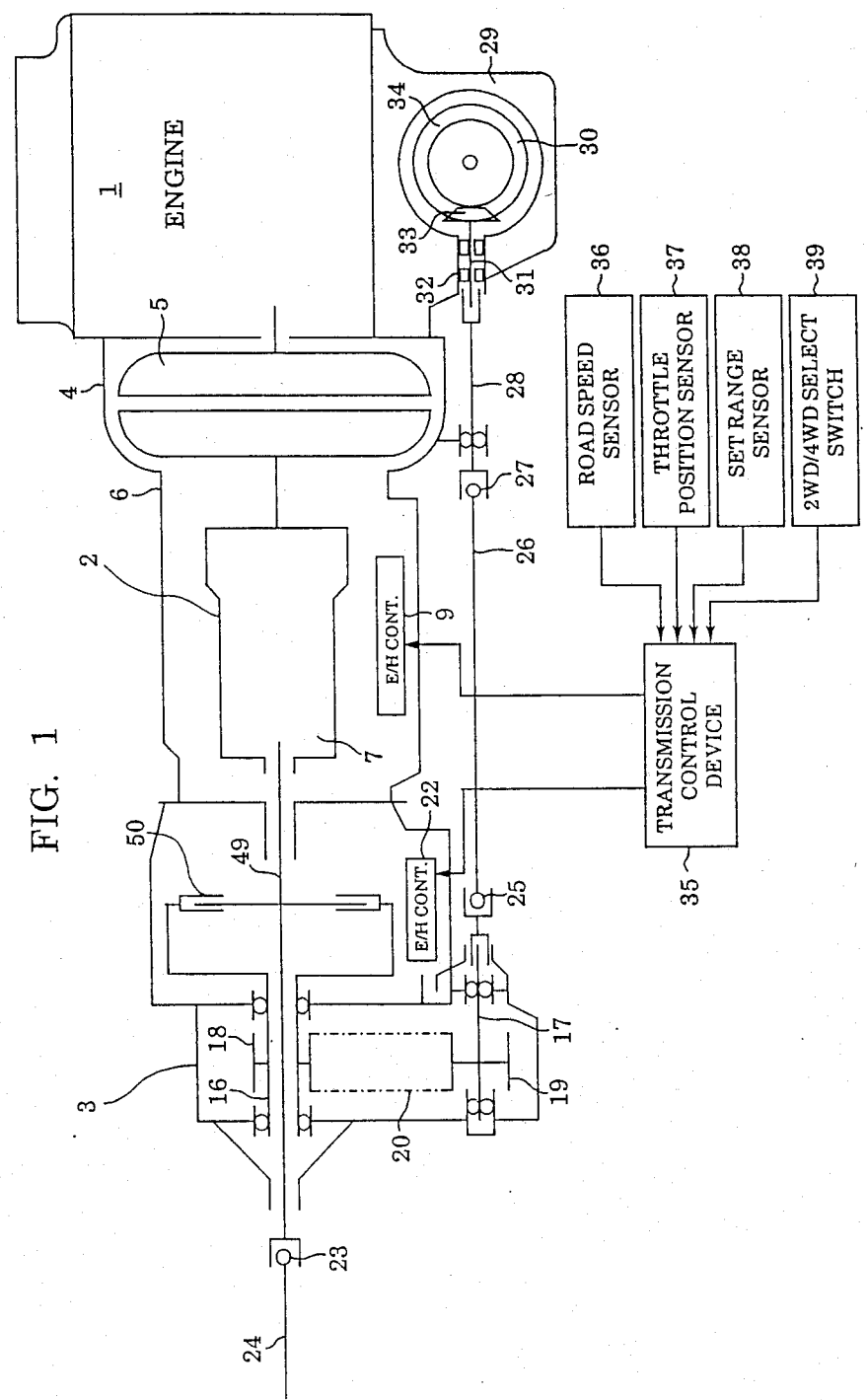
FIG. 1 is a schematic longitudinal skeleton view of a vehicle power train and of a control system therefor which incorporates the first preferred embodiment of the anti torque shock control device of the present invention, for practicing the first preferred method embodiment.

FIG. 1 is a schematic longitudinal skeleton view of a vehicle power train which incorporates the preferred embodiment of the anti torque shock control device of the present invention, said device performing a corresponding method embodiment. In this figure, the reference numeral 1 denotes an internal combustion engine of said vehicle, which is mounted, in this first exemplary case, longitudinally in the front engine room (not particularly shown) of said vehicle. And the reference numeral 2 denotes an automatic speed change device (automatic transmission) of a per se known type, while 3 denotes a four wheel drive power transfer device of a so called part time four wheel drive type, which is selectably operable either in four wheel drive mode or in two wheel drive mode, so as selectably either to drive both the rear pair of wheels of the vehicle and also the front pair of wheels of the vehicle or alternatively to drive only said rear pair of wheels of said vehicle but not said front pair of wheels of said vehicle, as will be explained in detail hereinafter, said four wheel drive power transfer device 3 not having any capability of providing any particular front/rear differential action.

In more detail, the automatic speed change device 2 incorporates a fluid torque converter 5 of a per se known construction, and the power input shaft of this fluid torque converter 5 is connected to and receives rotational power from a crank shaft of the internal combustion engine 1. And the fluid torque converter 5 is housed within a torque converter housing 4 fitted against and secured to the main body of the internal combustion engine 1, while the automatic speed change device 2 comprises a gear transmission mechanism 7, which is likewise housed within a speed change device housing fitted against and secured to the torque converter housing 4. And the input shaft of the gear transmission mechanism 7 is connected to and receives rotational power from the power output shaft of the fluid torque converter 5; and thereby the gear transmission mechanism 7 receives rotational power from the internal combustion engine 1, with a certain degree of slippage and also torque amplification being provided for said rotational power by the fluid torque converter 5 (unless a lock up clutch thereof, if provided thereto, is activated) as is per se conventional. This gear transmission mechanism 7 may for the purposes of this specification be of a per se known type incorporating various planetary gear mechanisms and friction engaging mechanisms such as clutches and brakes, and, according to selective actuation of said friction engaging mechanisms provided by an electrically controlled electric/hydraulic control mechanism 9 of a per se known sort including various speed change solenoids and so on, provides any one of a plurality of speed reduction stages between its said power input shaft and its power output shaft, its said power output shaft driving the four wheel drive power transfer device 3. Particularly according to the appropriate setting for the present invention, the combination of this automatic speed change device 2 and this electric/hydraulic control mechanism 9 is so constituted as to be capable of operating in various transmission operational ranges, including one or more drive ranges such as "D" range, "S" range, "L" range, and "R" range, and one or more non drive ranges such as "P" range and "N" range, according to the behest of the driver of the vehicle, who typically sets such an automatic transmission operational range upon a manual range setting device, not particularly shown in the figures, such as a shift lever or transmission push buttons or the like.

This four wheel drive power transfer device 3 incorporates a through shaft 49, which extends clear through said four wheel drive power transfer device 3 so that its one end extends out therefrom in the direction to the right as seen in FIG. 1, i.e. towards the front of the vehicle in this particular exemplary implementation, and is connected to the power output shaft of the gear transmission mechanism 7 so as to function as a power input shaft for this four wheel drive power transfer device 3; while the other end of this through shft 49 extends out of the four wheel drive power transfer device 3 in the opposite direction to the left as seen in FIG. 1, i.e. towards the rear of the vehicle in this particular exemplary implementation, so as to function also as a power output shaft for the rear wheels of the vehicle as will be described shortly. And a hollow sleeve shaped intermediate front wheel drive shaft 16 is provided, fitted around this through shaft 49 at its portion within the housing of this four wheel drive power transfer device 3, and this hollow sleeve shaped intermediate front wheel drive shaft 16 functions as another power output member for the four wheel drive power transfer device 3 for supplying power to the front wheels of the vehicle, and is rotationally connected to a front wheel power output shaft 17 provided below said sleeve shaped intermediate front wheel drive shaft 16 from the point of view of the figure and in the actual vehicle body also and with its central axis parallel to the central axis of said sleeve shaped intermediate front wheel drive shaft 16, via a sprocket wheel 18 fixedly mounted on the outside of said intermediate front wheel drive shaft 16, an endless chain 20 fitted around this sprocket wheel 18, and another sprocket wheel 19 which is fixedly mounted on said front wheel power output shaft 17. One end of the front wheel power output shaft 17 protrudes from the housing of this four wheel drive power transfer device 3 in the leftwards direction in the figure, i.e. towards the front end of the vehicle in this particular exemplary implementation.

Via a universal joint 23 of a per se known sort, the rear end of the through shaft 49 rotationally drives the front end of a rear wheel propeller shaft 24. And the rear end of this rear wheel propeller shaft 24 is connected via another universal joint (not particularly shown) to a differential device, (not particularly shown either), for driving the rear wheels (also not shown) of the vehicle.

And, via a universal joint 25 also of a per se known sort, the front end of the front wheel power output shaft 17 rotationally drives the rear end of a front wheel propeller shaft 26. Thus, this front wheel propeller shaft 26 extends alongside and generally below the automatic speed change device 2 including the fluid torque converter 5 therein, roughly parallel to the longitudinal axis thereof. The front end of this front wheel propeller shaft 26 is rotationally connected, via another universal joint 27 also of a per se known sort, to the rear end (relative to the vehicle body, not shown) of an intermediate shaft 28, which is supported from the torque converter casing 4 by means of a bearing assembly. And this intermediate shaft 28 is at its front end (also relative to the vehicle body) engaged by a spline construction or the like to the outer end of a input drive pinion shaft 31, which constitutes the power input shaft of a front differential device 30 which drives the front wheels (not shown) of the vehicle, and which is rotatably supported by bearings at its intermediate portion from the casing 32 of the front differential device 30; this casing 32 is integrally formed with the oil pan 29 of the internal combustion engine 1. The inner end of this input drive pinion shaft 31 is provided with a drive pinion 33 which is constituted as a bevel gear, with said drive pinion 33 being meshingly engaged with a driven ring gear 34 of the front differential device 30.

Further, within the four wheel drive power transfer device 3 there is provided a hydraulically operated wet type multi plate type clutch 50, which selectively either rotationally connects together, in this first exemplary case, the through shaft 49 and the sleeve shaped intermediate front wheel drive shaft 16, or alternatively allows said members to rotate freely with respect to one another. This wet clutch 50 is selectively operated, either to be engaged or to be disengaged, by an electrically actuated electric/hydraulic control device 22 to be described shortly. Accordingly the four wheel drive power transfer device 3, which receives rotational power input from the gear transmission mechanism 7 and always outputs said rotational power via the through shaft 49 to the rear vehicle wheels, can be controlled by the selective operation of the wet clutch 50 either to provide said rotational power also to the front wheel power output shaft 17, i.e. to cause the vehicle to be operated in four wheel drive mode, or alternatively not to provide any such rotational power to said front wheel power output shaft 17 and thus to cuse the vehicle to be operated in two wheel drive mode.

Thus, the power distribution ratio (drive torque distribution) between the intermediate front wheel drive shaft 16 and the rear wheel propeller shaft 24, of course when the clutch 50 of this four wheel drive power transfer device 3 is engaged, is unity, and therefore this four wheel drive power transfer device 3 is of the type which distributes the drive torque equally between the rear vehicle wheels and the front vehicle wheels.

The Hydraulic Clutch 50

Figure 2:
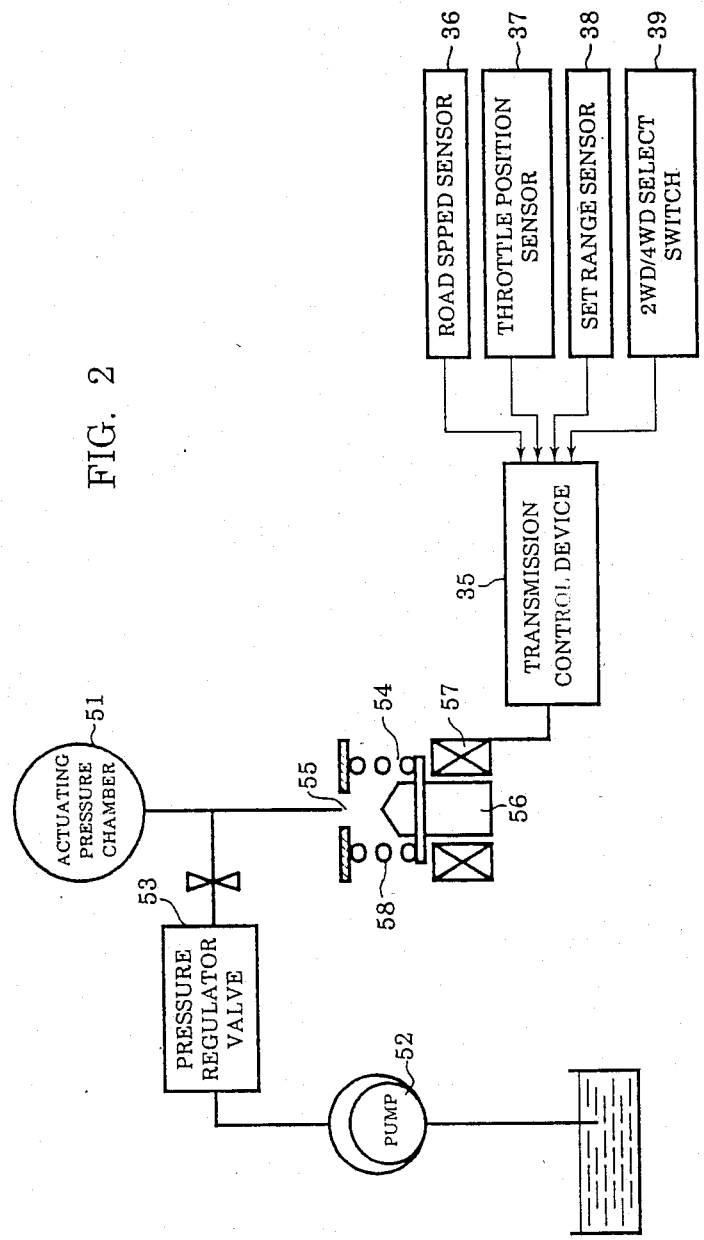
FIG. 2 is a schematic partial sectional view of a control system for a clutch of a four wheel drive power transfer device included in the FIG. 1 power train.

In FIG. 2, there is shown a schematic view of the actuation and control system for the clutch 50 of the four wheel drive power transfer device 3 which thus selectively couples together the through shaft 49 and the sleeve shaped intermediate front wheel drive shaft 16. In this figure, the reference numeral 51 denotes an actuating hydraulic fluid pressure chamber of said clutch 50, sid actuating hydraulic fluid pressure chamber 51 being partly defined by a piston or the like (not particularly shown) of said clutch 50, and, which supplied with actuating hydraulic fluid pressure greater than a determinate pressure level, pressing together via said piston, against the biasing force of a biasing means (not shown either) which is overcome, two sandwiched together sets of clutch plates (also not particularly shown) of said wet clutch 50, one of said clutch plate sets being rotationally mounted to said through shaft 49 and the other of said clutch plate sets being rotationally mounted to said sleeve shaped intermediate front wheel drive shaft 16. Thus, when this actuating pressure chamber 51 is thus supplied with actuating hydraulic fluid pressure of a particular sufficiently great line pressure level, it cuses said two sandwiched together sets of clutch plates to be mutually rotationally engaged, thus rotationally coupling together said through shaft 49 and said sleeve shaped intermediate front wheel drive shaft 16 and thus putting the four wheel drive power transfer device 3 into its four wheel drive operational mode; while, on the other hand, when said actuating pressure chamber 51 is not thus supplied with actuating hydraulic fluid pressure of said particular pressure level, it allows said two sandwiched together sets of clutch plates to be mutually rotationally disengaged by the biasing action of said biasing means, thus rotationally decoupling said through shaft 49 and said sleeve shaped intermediate front wheel drive shaft 16 from one another, thereby stopping the driving of said sleeve shaped intermediate front wheel drive shaft 16 by the engine 1 and thus putting the four wheel drive power transfer device 3 into its two wheel drive operational mode.

Although no particular use is made of such a concept in the shown first preferred embodiments of the anti torque shock control method and device of the present invention, in fact, if said actuating pressure chamber 51 is supplied with actuating pressure of a lower level than said line pressure level, it can cause said two sandwiched together sets of clutch plates to be mutually rotationally engaged to only a certain degree with a certain amount of slippage being available between them, thus rotationally coupling together said through shaft 49 and said sleeve shaped intermediate front wheel drive shaft 16 with a certain slippage amount therebetween, and thus putting the four wheel drive power transfer device 3 into its four wheel drive operational mode with a certain slippage amount.

Hydraulic fluid pressure is supplied to the pressure chamber 51 by the following arrangements, which correspond to the electric/hydraulic control device 22 of FIG. 1. A hydraulic fluid pump 52 picks up hydraulic fluid from a sump of the transmission system and pressurizes it. This pressurized hydraulic fluid is then supplied to a pressure regulator valve 53 of a per se known sort which regulates its pressure to a determinate line pressure value mentioned above. This line pressure is then fed via a restricted orifice and a conduit to said actuating pressure chamber 51 of said wet clutch 50, and this conduit is further connected to a control port 55 of an electromagnetically actuated hydraulic fluid drain valve 54. This electromagnetically actuated hydraulic fluid drain valve 54 has a solenoid 57 which controls the motion of a valve element 56 thereof. When the solenoid 57 is supplied with actuating electrical energy by a transmission control device 35 which will be explained hereinafter, then against the biasing force exerted by a compression coil spring 58 which is overcome said valve element 56 is impelled so that its tip is pushed against said control port 55, thus interrupting communication through said control port 55 and allowing hydraulic fluid pressure to be supplied into said actuating pressure chamber 51. When, on the other hand, said solenoid 57 is not supplied with any actuating electrical energy by a transmission control device 35 which will be explained hereinafter, then by the biasing force exerted by said compression coil spring 58 which is not opposed said valve element 56 is biased so that its tip is brought away from said control port 55, thus permitting communication through said control port 55 and thereby communicating the actuating pressure chamber 51 to drain and preventing allowing hydraulic fluid pressure from building up inside said actuating pressure chamber 51. In these first preferred embodiments of the anti torque shock control device of the present invention, therefore, line pressure is or is not supplied to said actuating pressure chamber 51 of said wet clutch 50, respectively according as to whether or not actuating electrical energy is supplied from said transmission control device 35 to this electric/hydraulic control device 22, and said wet clutch 50 thereby either is engaged, or is left disengaged, respectively.

However, in an alternative possible implementation, it would be possible for this electric/hydraulic control device 22 to be supplied with a pulsed electrical signal from the transmission control device 35, and in such a case, according to the duty ratio of this pulsed electrical signal, the ON/OFF duty factor of the electromagnetically actuated hydraulic fluid drain valve 54 would be determined, and this would enable the pressure provided in the pressure chamber 51 of the wet clutch 50 to be set to any pressure level between zero and line pressure level, and thereby the degree of rotational coupling together of the through shaft 49 and the sleeve shaped intermediate front wheel drive shaft 16 of the four wheel drive power transfer device 3 could be controlled to be any value between substantially zero and the substantially full rotational coupling together condition; and thereby the action of said four wheel drive power transfer device 3 for providing four wheel drive could be controlled to be any amount between substantially zero and substantially the fully four wheel drive condition.

Operation of This First Power Train

This vehicle power train ooperates as follows. When the clutch 50 of the four wheel drive power transfer device 3 is operated by the transmission control device 35 so as not to rotationally connect together the through shaft 49 and the sleeve shaped intermediate front wheel drive shaft 16, then the four wheel drive power transfer device 3 functions so as only to drive the rear wheel propeller shaft 24 but not to drive the intermediate front whel drive shaft 17, i.e. so as to receive rotational power provided by the engine 1 of the vehicle and transmitted to said four wheel drive power transfer device 3 via the automatic speed change device 2, and to distribute said rotational power only to the rear wheels of the vehicle taken as a combination but not to the front wheels of the vehicle taken as a combination. This is the two wheel drive operational mode. On the other hand, when the clutch 50 of the four wheel drive power transfer device 3 is operated by the transmission control device 35 so as to completely rotationally connect together the through shaft 49 and the sleeve shaped intermediate front wheel drive shaft 16, then the four wheel drive power transfer device 3 functions so as to drive the rear wheel propeller shaft 24 and also to drive the intermediate front wheel drive shaft 17, i.e. so as to receive rotational power provided by the engine 1 of the vehicle and transmitted to said four wheel drive power transfer device 3 via the automatic speed change device 2, and to distribute said rotational power both to the rear wheels of the vehicle taken as a combination and also to the front wheels of the vehicle taken as a combination. This is the four wheel drive operational mode. And intermediate modes of operation of the four wheel drive power transfer device 3 are available according to intermediate degrees of rotational coupling together of the through shaft 49 and the sleeve shaped intermediate front wheel drive shaft 16, by appropriate control thereof exerted by the transmission control device 35 as explained above.

The Transmission Control System

The following detectors and sensors are provided to this system (vide FIG. 1). A road speed sensor 36 detects a value representative of the road speed of the vehicle by measuring the rotational speed of the through shaft 49, and outputs an electrical signal representative thereof. A throttle position sensor 37 detects a value representative of the current load on the internal combustion engine 1 by measuring the opening angle of the throttle valve (not particularly shown) of a carburetor (not shown either) of said engine 1, and outputs an electrical signal representative thereof. (However, in other constructions other forms of load sensor could be used in place of this throttle position sensor 37). A set range sensor 38 detects the set position of the previously mentioned manual range setting device such as a range setting valve or the like which is provided for the transmission mechanism 2, and outputs an electrical signal representative thereof. And a manually operated 2WD/4WD select switch 39 is provided in the passenger compartment of the vehicle so as to be readily accessible to the driver of the vehicle, and can be set to either or two positions, a first position for indicating that the vehicle is to be operated in two wheel drive mode, i.e. that the four wheel drive power transfer device 3 is to be set to provide only rotational power to the rear wheel propeller shaft 24 and not to the front wheel power output shaft 17, and a second position for indicating that the vehicle is to be operated in four wheel drive mode, i.e. that the four wheel drive power transfer device 3 is to be set to provide rotational power both to the rear wheel propeller shaft 24 and also to the front wheel power output shaft 17. The output signals of these four sensors and switches 36, 37, 38, and 39 are fed to a transmission control device 35, previously mentioned.

This transmission control device 35 outputs control signals for controlling the electric/hydraulic control device 22 for the four wheel drive power transfer device 3 and the electrical/hydraulic control mechanism 9 for the gear transmission mechanism 7, as will now be explained. No concrete illustration of the structure of any particular realization of the transmission control device 35 will be given herein, since various possibilities for the details thereof can be easily supplemented by one of ordinary skill in the electronic art based upon the functional disclosures set out in this specification. In the various preferred embodiments of the anti torque shock control device of the present invention, in each case, the transmission control device 35 is typically concretely realized as a micro computer and its associated circuitry, said micro computer operating at the behest of a control program, various ones of which will be partially detailed shortly. However, it should be particularly understood that such realizations in the micro computer form, although preferred, are not the only ways in which the transmission control device 35 can be provided; in other possible embodiments it could be constituted as an electrical device not incorporating a micro processor, or indeed it could be a purely hydraulic device. In the preferred case, however, such a micro processor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 36 through 39 to the input port device, and drive circuits through which actuating electrical signals are passed from the output port device to a speed change control solenoid or solenoids (not particularly shown in the figures) of the electrical/hydraulic control mechanism 9 for controlling the automatic speed change device 2 and to the control solenoid 57 of the electric/hydraulic control device 22 for controlling the four wheel drive power transfer device 3.

The First Preferred Embodiments

Figure 3:
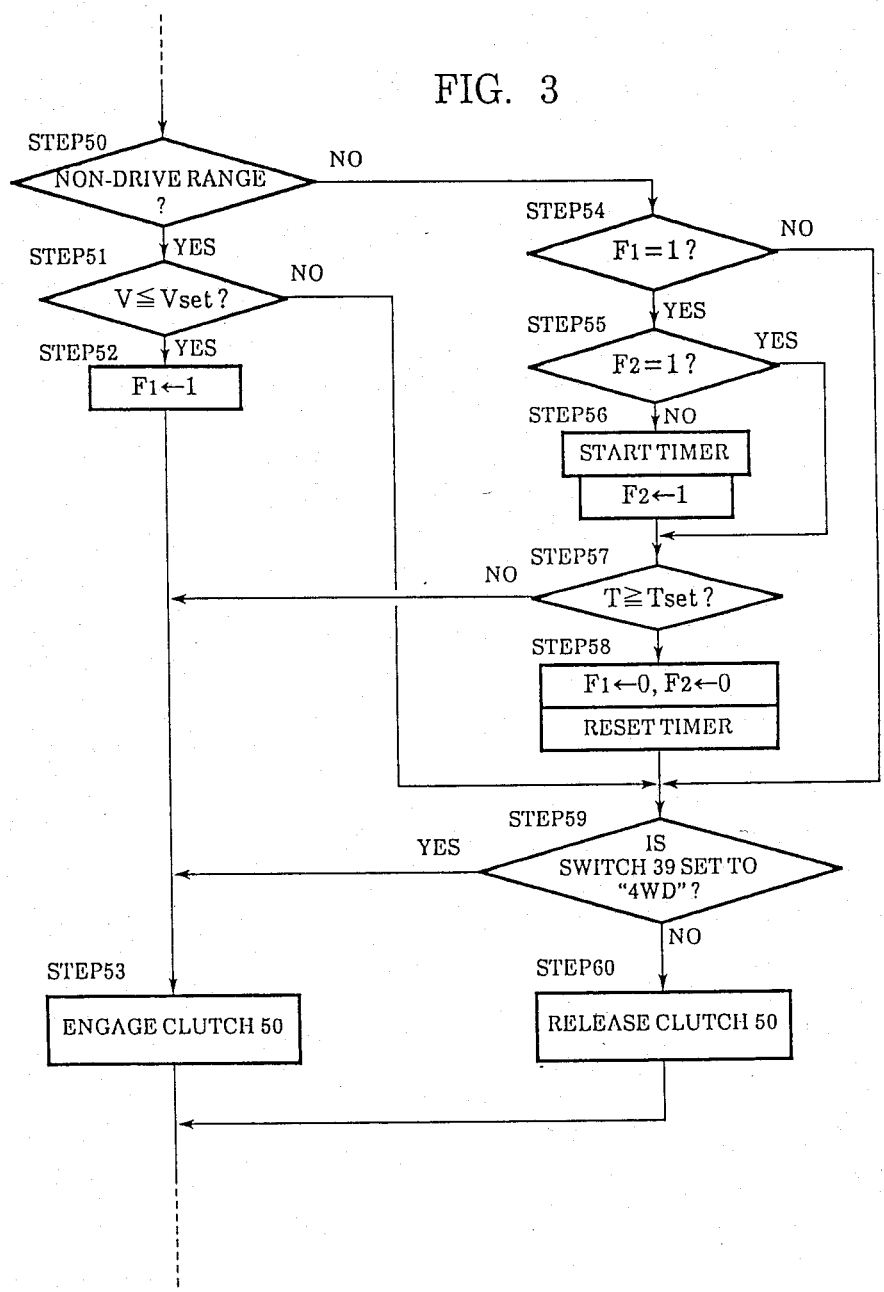
FIG. 3 is a partial flow chart for illustrating an anti torque shock control portion of a program obeyed by a micro computer incorporated in said control system of FIG. 1, to realize the first preferred embodiments of the anti torque shock control device and method of the present invention, said program portion being executed at regular and frequent intervals.

Now, in FIG. 3, a fragmentary flow chart is shown for a portion of the aforementioned control program which directs the operation of the transmission control device 35, according to the first preferred embodiment of the anti torque shock control method of the present invention, so as to realize the first preferred embodimetn of the anti torque shock control device of the present invention. This flow chart will now be explained. It should be understood that the transmission control device 35 generally functions so as to engage an appropriate one of the various speed stages of the gear transmission mechanism 7 of the transmission mechanism 2 according to the current values of various vehicle operating parameters such as the vehicle road speed as sensed by the vehicle road speed sensor 36, the engine load (throttle opening) as sensed by the throttle position sensor 37, and the operating range of the transmission as manually set by the vehicle driver on the setting means therefor as sensed by the set range sensor 38; such a function may be performed in a per se conventional way, and no particular program therefor is shown or suggested in this specification, since various possibilities for the details thereof can be easily supplemented as appropriate by one of ordinary skill in the transmission control and the programming arts, particularly when based upon the functional disclosures set out in this specification. The flow chart of FIG. 3 only shows the portion of the control program of the transmission control device 35 which controls the clutch 50 of the four wheel drive power transfer device 3, i.e. only shows the anti torque shock control routine of the transmission control device 35, which controls the supply of actuating electrical energy to the solenoid 57 of the electric/hydraulic control device 22. This program portion is executed at regulat intervals of for examle a few milliseconds, of course after the engine 1 is started as the four wheel drive vehicle incorporating it is driven. In summary: when the selected range for the operation of the automatic speed change device 2, as indicated by the set range sensor 38, is a drive range, i.e. typically is the "D" range, the "S" range, the "L" range, or the "R" range, then this transmission control device 35 controls the supply of actuating electrical energy to the solenoid 57 of the electric/hydraulic control device 22 to be ON or OFF, according respectively as to whether or not the manually operated 2WD/4WD select switch 39 is switched to its position indicating four wheel drive operation; with the added feature, particularly according to the concept of the present invention, that said transmission control device 35 controls the supply of actuating electrical energy to said solenoid 57 of said electric/hydraulic control device 22 to be O, irrespective of the setting of said manually operated 2WD/4WD select switch 39, while the selected range for the operation of the automatic speed change device 2, as indicated by the set range sensor 38, is a non drive range, i.e. typically is the "P" range or the "N" range, and also for a certain determinate time period after said selected range for the operation of the automatic speed change device 2 has altered from being a non drive range such as typically the "P" range or the "N" range, to being a drive range such as typically the "D" range, the "S" range, the "L" range, or the "R" range.

Thus, in this anti torque shock control routine, as its beginning in its first decision step 50, said micro processor makes a decision as to whether or not the currently set range for the automatic speed change device 2, as determined from the output signal of the set range sensor 38 therefor, is a non drive operational range, or not. Typically, as mentioned above, such a non drive range will be either the "P" range or the "N" range. If the answer to this decision is YES, so that in fact the currently engaged operational range for said automatic speed change device 2 is a non drive operational range, then next the flow of control passes to the decision step 51. On the other hand, if the answer to this decision is NO, so that in fact the current engaged operational range for said automatic speed change device 2 is not a non drive operational range and hence must be a drive operational range such as "D" range, "S" range, "L" range, or "R" range, then next the flow of control passes to the decision step 54.

In the decision step 51, the micro processor makes a decision as to whether or not the current value of vehicle road speed, as indicated by the road speed sensor 36, is less than a determinate road speed value Vset, which is set to be a very low value, so that, effectively, this decision step tests as to whether or not the vehicle is substantially at rest. If the answer to this decision is YES, so that in fact the current value of vehicle road speed is less than said determinate road speed value Vset and the vehicle is substantially at rest, then next the flow of control passes to the step 52. On the other hand, if the answer to this decision is NO, so that in fact the current value of vehicle road speed is greater than said determinate road speed value Vset and the vehicle is not substantially at rest, then next the flow of control passes to the decision step 59.

In the step 52, at which program point it has been established that the vehicle is substantially at rest and the automatic speed change device 2 is being operated in a non drive range, the value of a flag F1 is set to unity. And then next the flow of control passes to the step 53.

In this step 53, the micro processor outputs an appropriate control signal to the electric/hydraulic control device 22, i.e. energizes the solenoid 57, so as to ensure that the wet clutch 50 of the four wheel drive power transfer device 3 is engaged by supply of line pressure to the actuating pressure chamber 51 thereof. Thus full four wheel drive operation is provided, and both the rear wheels of the vehicle and also the front wheels of the vehicle are together connected to any output power which may be being provided from the automatic speed change device 2. And then next the flow of control passes to leave this routine, without doing anything further.

On the other hand, if the currently set range for the automatic speed change device 2, as determined in the decision step 50 from the output signal of the set range sensor 38 therefor, is not a non drive operational range, then next, in the decision step 54, the micro processor makes a decision as to whether or not the value of the flag F1 is unity. If the answer to this decision is YES, so that in fact F1=1, then next the flow of control passes to the decision step 55. On the other hand, if the answer to this decision is NO, so that in fact F1=0, then the flow of control skips to pass next to the decision step 59, which is also the point to which the flow of control was passed in the NO branch from the decision step 51.

In the decision step 55, at which point it is determined that the currently set range for automatic speed change device 2 is a drive operational range and also the vehicle speed is below the determinate value Vset therefor, the micro processor makes a decision as to whether or not the value of a flag F2 is unity. This flag F2 is used for showing whether or not a timer has been started. If the answer to this decision is YES, so that in fact the value of said flag F2 is unity and said timer has been already started, then the flow of control skips to pass next to the decision step 57. On the other hand, if the answer to this decision is N, so that in fact the value of said flag F2 is zero and said timer has not yet been started, then next the flow of control passes to the step 56.

In the step 56, the micro processor starts the aforementioned timer, and also sets the value of the flag F2 to unity, to indicate that said timer has been started. And then next the flow of control passes to the decision step 57.

In this decision step 57, the micro processor makes a decision as to whether or not the time interval currently counted by the timer has exceeded a certain determinate time interval Tset. If the answer to this decision is YES, so that in fact the timed interval has indeed exceeded said determinate time interval Tset, then next the flow of control passes to the step 58. On the other hand, if the answer to this decision is NO, so that in fact the timed interval has not yet exceeded said determinate time interval Tset, then next the flow of control passes to the step 53, in which, as before, the clutch 50 of the four wheel drive power transfer device 3 is engaged by supply of line pressure to the actuating pressure chamber 51 thereof, so as to cause full four wheel drive operation to be provided, so that both the rear wheels of the vehicle and also the front wheels of the vehicle are together connected to the output power provided from the automatic speed change device 2.

On the other hand, in the step 58, at which point it is determined that the determinate time interval Tset hs been timed by the timer. i.e. that said determinate time interval Tset has elapsed since shifting the set operational range of the automatic speed change device 2 as detected by the set range sensor 38 from a non drive range select position to a drive range select position, the micro processor sets the values of the flags F1 and F2 both to zero, and also resets the timer. And then next the flow of control passes to the decision step 59.

In this decision step 59, the micro processor makes a decision as to whether or not the manually operated 2WD/4WD select switch 39 is set to its position indicating four wheel drive vehicle operation. If the answer to this decision is YES, so that in fact four wheel drive operation is currently selected, then next the flow of control passes to the step 53, as before, and definitely four wheel drive vehicle operation is performed. On the other hand, if the answer to this decision is NO, so that in fct two wheel drive operation of the vehicle is currently desired, then next the flow of control passes to the step 60.

In this step 60, the micro processor outputs an appropriate control signal to the electric/hydraulic control device 22, i.e. deenergizes the solenoid 57, so as to ensure that the wet clutch 50 of the four wheel drive power transfer device 3 is disengaged according to non supply of line pressure to the actuating pressure chamber 51 thereof. Thus two wheel drive operation is provided, and only the rear wheels of the vehicle but not the front wheels of the vehicle are connected to any output power which may be being provided from the automatic speed change device 2. And then next the flow of control passes to leave this routine, without doing anything further.

And, by the repetition of the FIG. 3 program in a relatively tight and quick cycle with a period of the order of milliseconds, the control of the clutch 50 of the four wheel drive power transfer device 3 is maintained.

Thus, according to this mode of control according to these first preferred embodiments of the anti torque shock control method and device of the present invention, when the operational range of the automatic speed change device 2 is switched from a non drive range such as "P" range of "N" range to a drive range such as "D" or "R" range, in fact by the vehicle driver manually actuating the manual setting means therefor and thereby actuating the set range sensor 38 to provide an indication thereof, at this time, for a certain time period Tset and irrespective of the current setting of the manually operated 2WD/4WD select switch 39, the clutch 50 of the four wheel drive power transfer device 3 is definitely engaged, so as at least for this short time period Tset to definitely provide four wheel drive operation of the vehicle; and this prevents the occurrence of any large drive train torque shock upon this shifting of the operational range of the automatic speed change device 2 from a non drive range such as "P" range or "N" range to a drive range such as "D" or "R" range. Accordingly, the reliability and the life span of the drive train as a whole of the vehicle are desirably extended. Furthermore, the emission of any unpleasant noise such as "clonking" during this engagement of a transmission drive range from a non drive range is positively avoided, and further vehicle squat during such an operation, which might occur if two wheel drive operational mode of the vehicle were being provided at this time due to the powering up of the rear wheels of the vehicle while the front vehicle wheels were not powered up, is definitely prevented.

In the shown type of normal operation of the four wheel drive power transfer device 3, in this exemplary application of the anti torque shock control device of the present invention, said four wheel drive power transfer device 3 was manually switched by the vehicle operator between its two wheel drive operational mode and its four wheel drive operational mode, according to control by the manually operated 2WD/4WD select switch 39. However, in an alternative application, it might be possible for said selection between two wheel drive operation and four wheel drive operation, in other words for the control of the wet clutch 50 of the four wheel drive power transfer device 3, to be performed automatically according to a control method and device therefor, for example according to the difference between the rotational speed of the front vehicle wheels and the rotational speed of the rear vehicle wheels, and/or according to the load on the internal combustion engine 1, and/or according to the steering angle of the steering system (not particularly shown) of the vehicle, and/or according to the braking situation of the vehicle, and/or the like. In such a case, according to the present invention, similarly to the above described operation, when the operational range of the automatic speed change device 2 is switched from a non drive range such as "P" range or "N" range to a drive range such as "D" or "R" range, at this tim for a certain time period Tset and irrespective of any such otherwise determined current control state for selecting between two wheel drive and four wheel drive transmission operation, the clutch 50 of the four wheel drive power transfer device 3 should be definitely engaged, so as at least for this short time period Tset to definitely provide four wheel drive operation of the vehicle. The same benefits and advantages would be available, in such a case, as detailed above with regard to the first preferred embodiment of the anti torque shock control device of the present invention as shown in FIGS. 1 through 3; accordingly, intimate details thereof will not be particularly descanted upon.

The Second Power Train and the Second Preferred Embodiments

It should be noted that the merit of the present invention with regard to anti torque shock control relates generally to the rotational coupling together of two at least of the wheels of the vehicle to which said present invention is provided, and is not to be considered as being specifically limited to the selective operation of such a four wheel drive power transfer device as the four wheel drive power transfer device 3 of the shown application of the first preferred embodiments of the anti torque shock control method and device of the present invention as described above, in order to switch said four wheel drive power transfer device between the two wheel drive operational mode and the four wheel drive operational mode; such an application is merely a specialized use of the principle of the present invention. In the next preferred embodiments of the anti torque shock control method and device of the present invention, there is exemplarily shown the control of a differential control clutch which controls a central differential device of a full time four wheel drive transmission system either to provide, or not to provide, its differential action. This is another application of the principle of the present invention.

Figure 4:
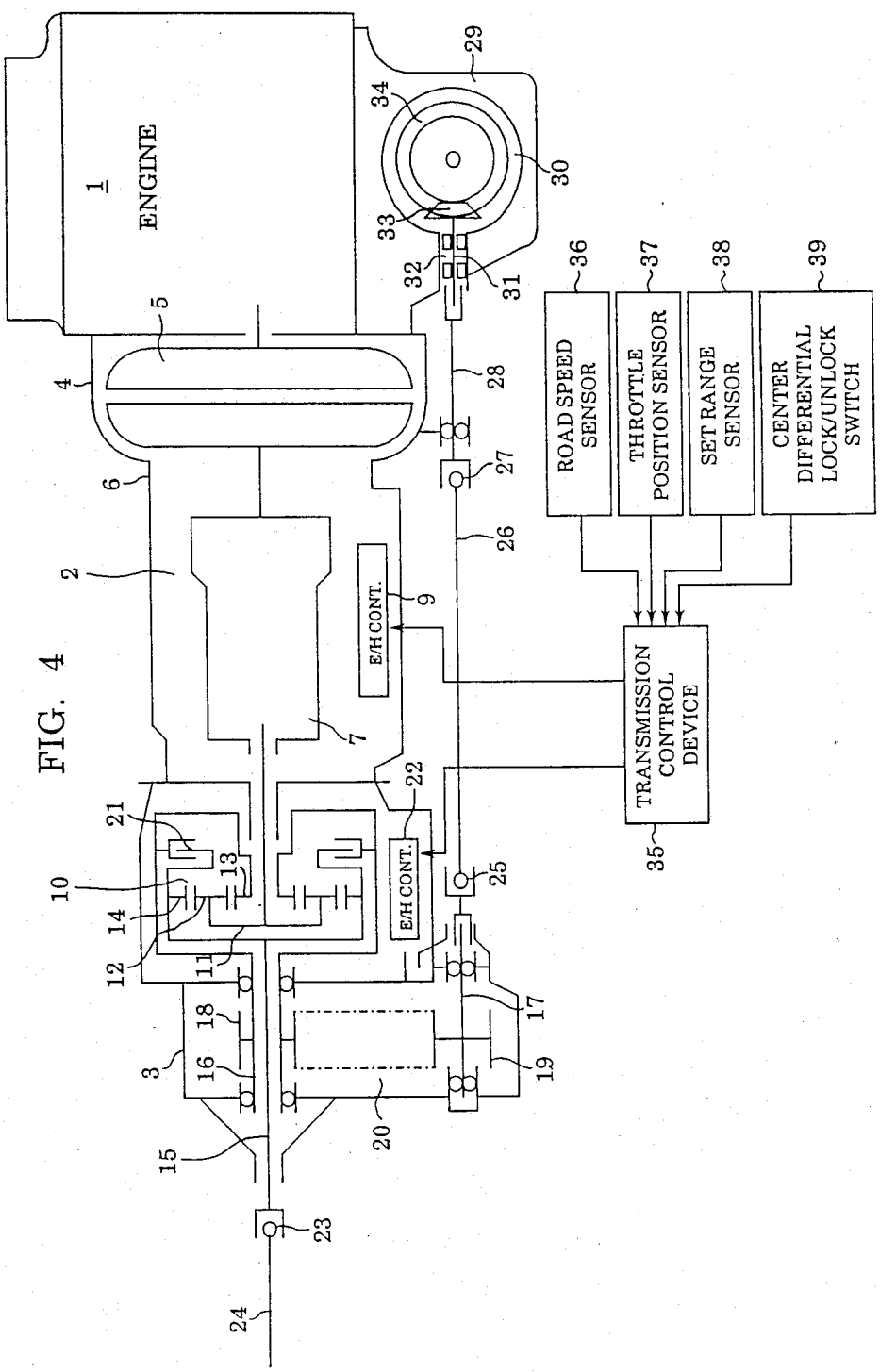
FIG. 4 is similar to FIG. 1, being a schematic longitudinal skeleton view of a vehicle power train and of a control system therefor which incorporates the second preferred embodiment of the anti torque shock control device of the present invention, for practicing the second preferred method embodiment.

In detail then, in FIG. 4 which is similar to FIG. 1 relating to the first preferred embodiments there is shown a schematic longitudinal skeleton view of a vehicle power train and of a control system therefor, which incorporates the second preferred embodiment of the anti torque shock control device of the present invention, for practicing the second preferred method embodiment. In this figure, parts which are like to parts shown in FIG. 1 are denoted by the same reference numerals. In this second preferred embodiment, the different with regard to the power train of the vehicle is that the four wheel drive power transfer device 3, rather than being a simple device incorporating substantially only a clutch as was the four wheel drive power transfer device 3 of the application of the first preferred embodiments described above, instead incorporates a center differential device 10 of a planetary gear wheel type for providing full time differential action between the front wheels of the vehicle and the rear wheels of the vehicle during the full time four wheel drive operation thereof. And the difference relating to the control system is that the switch 39, rather than being a manually operated 2WD/4WD select switch 39 as in the case of the FIG. 1 construction, is now a center differential lock/unlock switch. Now the detailed construction of this center differential device 10 will be explained; in this connection, the through shaft 49, which was provided in the FIG. 1 construction, here on the other hand is no longer provided. The center differential device 10 comprises a sun gear 13, a ring gear 14, a carrier 11, and a plurality of planetary pinions 12 rotatably mounted to said carrier 11 and meshed between the sun gear 13 and the ring gear 14 and performing planetary movement between them in a per se known manner. The carrier 11 functions as an input member for this center differential device 10, and is rotationally connected to the output shaft of the gear transmission mechanism 7 via a shaft which passes through the central axis of the hollow sun gear 13. The ring gear 14 functions as one power output member for the center differential device 10 for supplying power to the rear wheels of the vehicle, and is rotationally connected to a rear wheel power output shaft 15 which extends out of the four wheel drive power transfer device 3 in the direction to the left as seen in FIG. 1, i.e. towards the rear of the vehicle in this particular exemplary implementation. The rear end of this rear wheel power output shaft 15 is connected via the universal joint 23 to the rear wheels propeller shaft 24 to drive the rear vehicle wheels. And the sun gear 13 functions as another power output member for the center differential device 10 for supplying power to the front wheels of the vehicle, and is rotationally connected to a sleeve shaped intermediate front wheel drive shaft 16, which corresponds to the front wheel drive shaft 16 of the FIG. 1 application for the first preferred embodiments, via a drum member fitted around the center differential device 10 as a whole.

Thus, the power distribution ratio (drive torque distribution) between the intermediate front wheel drive shaft 16 and the rear wheel power output shaft 15, when this four wheel drive power transfer device 3 is operating, is determined by the relative tooth counts of the sun gear 13 and the ring gear 14 in the following manner:

$$Rr = 1/(1+Rg)$$

$$Rf = Rg(1 + Rg)$$

where:
Rr is the rear wheel distribution ratio;
Rf is the front wheel distribution ratio;
and Rg is the ratio of the number of teeth on the sun gear 13 to the number of teeth on the ring gear 41.

Because the number of teeth on the sun gear 13 is naturally greater than the number of teeth on the ring gear 14, thus, providing that the number of teeth on the sprocket wheel 18 and the number of teeth on the sprocket wheel 20 are the same, this four wheel drive power transfer device 3 is of the type which distributes a larger amount of torque to the rear vehicle wheels than to the front vehicle wheels.

Further, within the four wheel drive power transfer device 3 there is provided a hydraulically operated wet type multi plate type clutch 21, which selectively either rotationally connects together the sun gear 13 nd the ring gear 14 (actually the ring gear 14 is selectively rotationally connected by the clutch 21 to the drum member enclosing the whole planetary gear apparatus, which is rotationally connected to said sun gear 13), or alternatively allows said members to rotate freely with respect to one another. This wet clutch 21 is selectively operated by an electrically actuated electric/hydraulic control device 22, corresponding to the electric/hydraulic control device 22 of the FIG. 1 application of the first preferred embodiments. Accordingly, the four wheel drive power transfer device 3, which receives rotational power input from the gear transmission mechanism 7 and outputs said rotational power to the rear wheel power output shaft 15 and to the front wheel power output shaft 17, can be caused either to provide differential action for distribution said rotational power between said rear wheel power output shaft 15 and said front wheel power output shaft 17, or not to provide any such differential action and just to drive said shafts 15 and 17 independently, by selective engagement or non engagement of said clutch 21, which may be operated by a system like the FIG. 2 clutch operating system. In detail, when hydraulic pressure of at least a determinate pressure level is supplied to the pressure chamber of the clutch 21, said clutch 21 is engaged, thereby rotationally coupling together the sun gear 13 and the ring gear 14, and thereby stopping the differential action of the central differential device 10 of the four wheel drive power transfer device 3. In this case, the center differential device 10 functions so as to provide no differential effect between the rear wheel power output shaft 15 and the intermediate front wheel drive shaft 17, i.e. so as to distribute the rotational power provided from the engine 1 via the automatic speed change device 2 directly to the rear wheels of the vehicle taken as a combination and also to the front wheels of the vehicle taken as a combination in an even fashion without provision of any differential effect. On the other hand, when on such hydraulic pressure is supplied to the pressure chamber of said clutch 21, said clutch 21 is disengaged, thereby rotationally decoupling the sun gear 13 and the ring gear 14 and allowing them to rotate substantially independently, and thereby the central differential device 10 of the four wheel drive power transfer device 3 is allowed to perform differential action without substantial impediment thereof. In this case, the center differential device 10 functions so as to provide its differential effect between the rear wheel power output shaft 15 and the intermediate front wheel drive shaft 17, i.e. so as to receive rotational power provided by the engine 1 of the vehicle and transmitted to said four wheel drive power transfer device 3 via the automatic speed change device 2, and to distribute said rotational power between the rear wheels of the vehicle taken as a combination and the front wheels of the vehicle taken as a combination. Accordingly, in this case, the power distribution (torque distribution) ratio between the front wheels of the vehicle and the rear wheels of the vehicle is determined, when the four wheel drive power transfer device 3 is operating in the above mode, by the ratio of the tooth counts of the sun gear 13 and the ring gear 14, as explained above.

This vehicle power train may be operated, according to the second preferred embodiments of the anti torque shock control method and device of the present invention, according to the FIG. 3 flow chart (with *mutatis mutandis* in a per se obvious fashion regarding the center differential lock/unlock switch 39). In this case, when the clutch 21 of the four wheel drive power transfer device 3 is operated by the transmission control device 35 so as not to rotationally connect together the sun gear 13 and the ring gear 14, then, when the operational range of the automatic speed change device 2 comes to be switched from a non drive range such as "P" range or "N" range to a drive range such as "D" or "R" range by the vehicle driver manually actuating the manual setting means therefor and thereby actuating the set range sensor 38 to provide an indication thereof, then, starting at this time and for a certain time period Tset thereafter, and irrespective of the current setting of the center differential lock/unlock switch 39, the clutch 50 of the four wheel drive power transfer device 3 is definitely engaged, so as at least during this relatively short time period Tset to definitely prevent central differential device operation during the four wheel drive operation of the vehicle; and this prevents the occurrence of any large drive train torque shock upon this shifting of the operational range of the automatic speed change device 2 from a non drive range such as "P" range or "N" range to a drive range such as "D" or "R" range, and prevents the shift shock being preferentially suffered by one of the front and rear differential devices of the vehicle (in this shown exemplary case it would be the rear differential device that would suffer more than the front differential device). Further, the ill effects that might occur due to slack in one only of the differential devices of the vehicle are mitigated. Accordingly, the reliability and the life span of the drive train as a whole of the vehicle are desirably extended. Furthermore, the emission of any unpleasant noise such as "clonking" during this engagement of a transmission drive range from a non drive range is positively avoided, and further vehicle squat during such an operation, which might occur if the central differential device effective operational mode of the vehicle were being provided at this time due to the differential powering up of the rear wheels of the vehicle as opposed to the front vehicle wheels, is definitely prevented.

Again, in a possible alternative application, it might be possible for said selection between central differential device operation and non operation, in other words for the usual method of control of the wet clutch 50 of the four wheel drive power transfer device 3, to be performed automatically according to a control method and device therefor, rather than by the manually controlled operation of the center differential lock/unlock switch 39 as suggested above. In such a case, according to the present invention, similarly to the above described operation, when the operational range of the automatic speed change device 2 is switched from a non drive range such as "P" range or "N" range to a drive range such as "D" or "R" range, at this time for a certain time period Tset and irrespective of any such otherwise determined current control state for selecting between central differential device operation and non operation, the clutch 50 of the four wheel drive power transfer device 3 should be definitely engaged, so as at least for this short time period Tset to definitely provide no central differential device operation of the vehicle. The same benefits and advantages would be available, in such a case, as detailed above with regard to the second preferred embodiment of the anti torque shock control device of the present invention as shown in FIGS. 1 through 3 and discussed above; accordingly, the details thereof will not be particularly discussed herein, in view of the desirability of conciseness of disclosure.

Third Exemplary Overall Vehicle Power Train Structure

Figure 5:
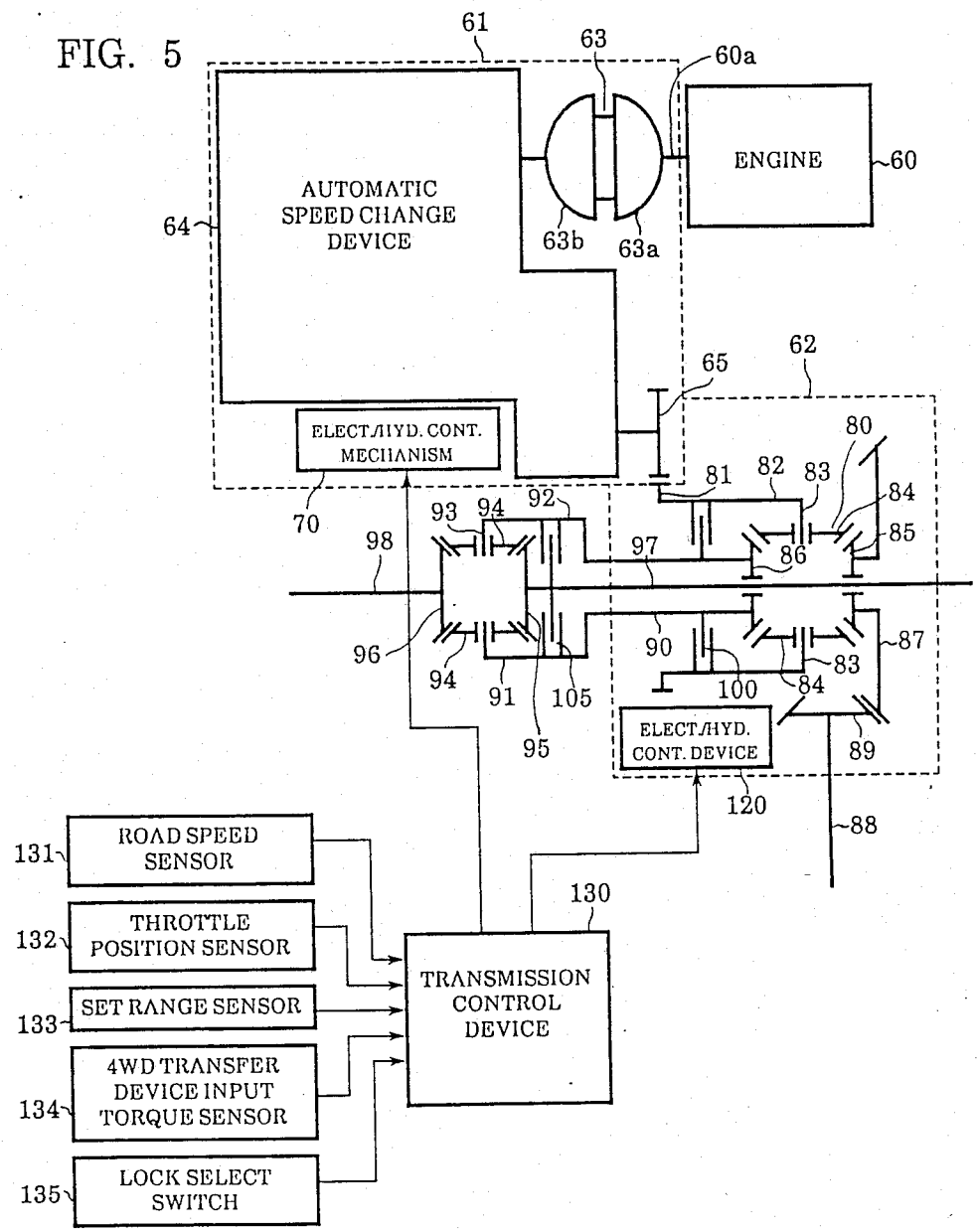
FIG. 5, which corresponds to but is not particularly similar to FIG. 4, is a schematic longitudinal skeleton view of another vehicle power train and of a control system therefor which incorporates the third preferred embodiment of the anti torque shock control device of the present invention, for practicing the third preferred method embodiment.

FIG. 5 is a schematic longitudinal skeleton view of a vehicle power train which incorporates the third preferred embodiment of the anti torque shock control device of the present invention, said device performing the third method embodiment. In this figure, the reference numeral 60 denotes an internal combustion engine of said vehicle, which is mounted, in this third exemplary case, transversely in the front engine room (not particularly shown) of said vehicle. And the reference numeral 61 denotes an automatic speed change device (automatic transmission) of a per se known type, while 62 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 62 being selectably either provided or not provided as will be explained in detail hereinafter. And the reference numeral 91 denotes a front differential device, the differential action provided by which between the two front vehicle wheels being also selectably either provided or not provided as will be explained in detail hereinafter.

In more detail, the automatic speed change device 61 incorporates a fluid torque converter 63 of a per se known construction, and the power input shaft 60a of this fluid torque converter 63 is connected to and receives rotational power from a crank shaft of the internal combustion engine 60. And the fluid torque converter 63 comprises a pump impeller member 63a and a turbine member 63b, as is per se conventional, while the automatic speed change device 61 may, in this case, be a per se conventional type of planetary wheel speed change device which incorporates various planetary gear mechanisms and which according to selective supply of actuating hydraulic fluid pressures to various friction engaging mechanisms incorporated in it provides one of various different gearing ratios including several forward speed stages and at least one reverse speed stage between its power input shaft and its power output shaft. And an input shaft of the automatic speed change device 61 is connected to and receives rotational power from the power output shaft of the fluid torque converter 63; and thereby the automatic speed change device 61 receives rotational power from the internal combustion engine 60, with a certain degree of slippage and also torque amplification being provided for said rotational power by the fluid torque converter 63 (unless a lock up clutch thereof, if provided thereto, is activated) as is per se conventional. This switching over of speed stages of the automatic speed change device 61 is controlled by a per se known type of electrically controlled electric/hydraulic control mechanism 70. And the automatic speed change device 61 has a power output gear pinion 65 to which it supplies output rotational power.

The four wheel drive power transfer device 62 incorporates a center differential device 80 of a bevel gear wheel type for providing full time differential action between the front wheels of the vehicle and the rear wheels of the vehicle during the full time four wheel drive operation thereof. Now the detailed construction of this center differential device 80 will be explained. It comprises a differential case 82 which is provided integrally with a power input gear wheel 81 which is meshed with the aforementioned output gear pinion 65, and to this differential case 82 there are rotatably mounted by two pinion shafts 83 two differential pinions 84 which directly oppose one another. On the right as seen in the figure there is provided a rear wheel power output gear wheel 85 which is meshed with both of these differential pinions 84, and similarly on the left as seen in the figure there is provided a front wheel power output gear wheel 86 which is likewise meshed with both of the differential pinions 84.

To the rear wheel power output gear wheel 85 there is connected a rear wheel output side gear wheel 87, and a rear wheel drive gear wheel 89 is meshed with this rear wheel output side gear wheel 87 and drives a rear wheel drive shaft 88. This rear wheel drive shaft 88 rotationally drives the front end of a rear wheel propeller shaft (not particularly shown) the rear end of which rotationally drives a power input shaft of a rear wheels differential device (not particularly shown either) for driving the rear wheels (also not shown) of the vehicle.

Further, to the front wheel power output gear wheel 86 there is connected the end of a tubular front wheel drive shaft 90 which rotationally drives the differential case 92 of a front wheels differential device 91 of a bevel gear wheel type for providing differential action between the front wheels of the vehicle. Now the detailed construction of this front wheels differential device 91 will be explained. It comprises said differential case 92, and to this differential case 92 there are rotatably mounted by two pinion shafts 93 two differential pinions 94 which directly oppose one another. On the left as seen in the figure there is provided a left front wheel power output gear wheel 96 which is meshed with both of these differential pinions 95, and similarly on the right as seen in the figure there is provided a right front wheel power output gear wheel 95 which is likewise meshed with both of the differential pinions 94. The left front wheel power output gear wheel 96 rotationally drives a left front wheel drive shaft 98 which leads to the left front wheel of the vehicle (not particularly shown) to drive it, and similarly the right front wheel power output gear wheel 95 rotationally drives a right front wheel drive shaft 97 which passes through the center of the center differential device 80 and then leads to the right front wheel of the vehicle (not particularly shown either) to drive it.

Further, within the four wheel drive power transfer device 62 there is provided a hydraulically operated wet type multi plate type clutch 100, which selectively either rotationally connects together, in this second exemplary case, the differential casing 82 which is the rotational power input member of the center differential device 80 and the tubular front wheel drive shaft 90, or alternatively allows said members to rotate freely with respect to one another. This wet clutch 100 is selectively operated by an electrically actuated electric/hydraulic control device 120, and, according to this operation, said four wheel drive power transfer device 62, which receives rotational power input from the automatic speed change device 64 and outputs said rotational power to the rear wheel power output shaft 88 and to the front wheel power output shaft 90, can be caused either to provide differential action for distributing said rotational power between said rear wheel power output shaft 88 and said front wheel power output shaft 90, or not to provide any such differential action and just to drive said shafts 88 and 90 independently, or to function in an intermediate mode of providing a certain degree of said differential actin albeit somewhat impeded.

The Hydraulic Clutch 100

Figure 6:
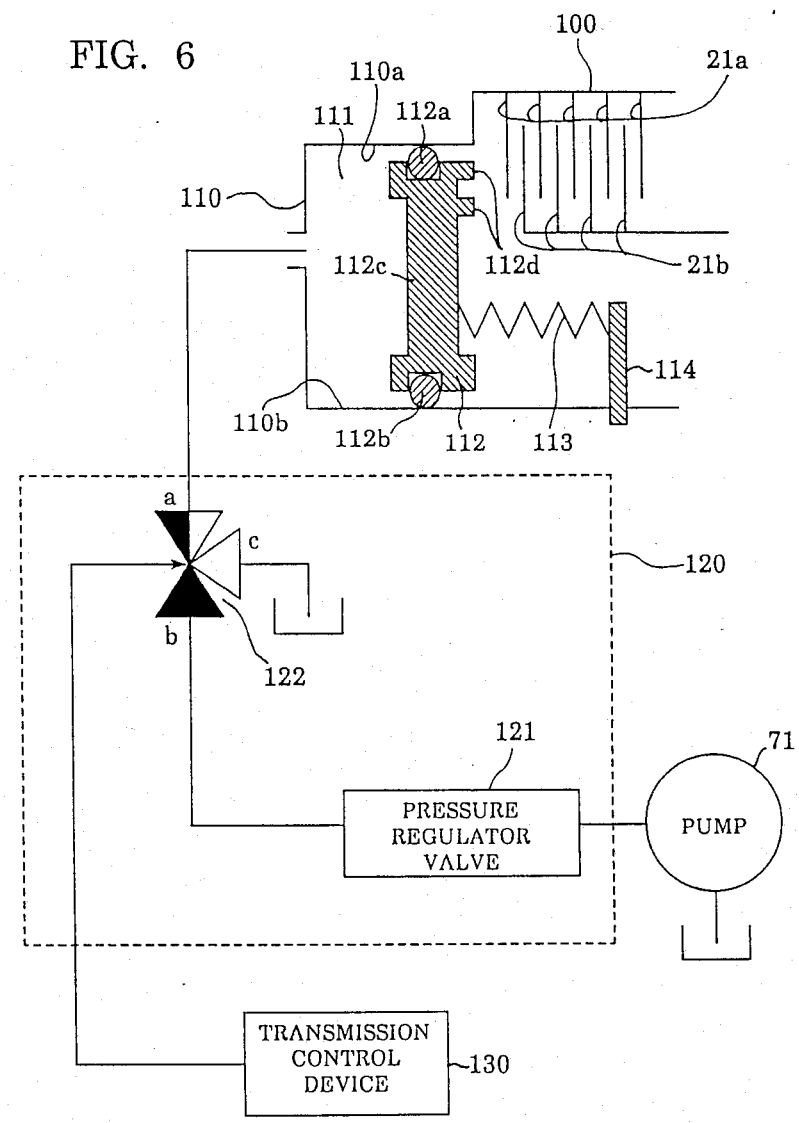
FIG. 6 is a schematic partially block diagrammatical partially sectional view showing a central differential device control clutch of the FIG. 5 construction, along with parts of a control system therefor.

Now, this clutch 100 of the central differential device 80 of the four wheel drive power transfer device 62 and its actuation and control system 120 will be explained, with reference to FIG. 6 which is a schematic partial sectional view of said clutch 100; and in this figure there is further shown in block diagram form the actuation and control system for said clutch 100. In this figure, the reference numerals 21a and 21b denote two sets of clutch plates of said clutch 100, said clutch plate sets 21a and 21b being sandwiched together with the one 21a of said clutch plate sets being rotationally coupled to one of said differential casing 82 and said shaft 90 while the other 21b of said clutch plate sets is rotationally coupled to the other of said differential casing 82 and said shaft 90. Each of these clutch plates is in fact formed as a circularly symmetric flat annulus of which only a half section can be seen in FIG. 6. Similarly, a generally symmetric actuator is designated as 110, and this actuator 110 comprises an oute cylinder bore 110a and an inner cylinder bore 110b which cooperate to define a toroidal cylindrical space between them; these outer and inner cylinder bores 110a and 110b are formed in some member which rotates with one of the differential casing 82 and the shaft 90. And an annular piston member 112 is fitted in said toroidal space, with its outer cylindrical surface sliding in the outer cylinder bore 110a with a sealing ring 110a interposed therebetween, and with its inner cylindrical surface sliding in the inner cylinder bore 110b with a sealing ring 110b interposed therebetween. Thereby, a hydraulic pressure chamber 111 is defined to the left of the piston member 112 in FIG. 6, between it and an end of the toroidal cylindrical space between the outer cylinder bore 110a and the inner cylinder bore 110b, with a surface designated as 112c of the piston member 112 serving to partly define said pressure chamber 111. The opposite side of the piston member 112 from the surface 112c thereof is formed with a pair of longitudinally raised circular ribs 112d, and these ribs 112d are positioned so as to confront the superposed sandwich of the clutch plate sets 21a and 21b. And the piston member 112 is biased in the leftwards direction as seen in the figure, so as to reduce the volume of the pressure chamber 111, by an annular compression spring 113 which bears against an annular member 114 fitted to the inner cylinder bore 110b.

Thus, when hydraulic pressure of a particular pressure level is supplied to the pressure chamber 111, the piston member 112 is driven in the rightwards direction as seen in the figure against the biasing action of the compression spring 113 which is overcome, so that the raised circular ribs 112d press against the superposed sandwich of the clutch plate sets 21a and 21b, and this causes said clutch plate sets 21a and 21b to be rotationally coupled together, thereby rotationally coupling together the differential casing 82 and the shaft 90. Further, the degree of rotational coupling together of said differential casing 82 and said shaft 90 is determined by the magnitude of the pressure level supplied to said pressure chamber 111, with a roughly linear proportionally obtaining therebetween; and thereby the differential action of the central differential device 80 of the four wheel drive power transfer device 62 is impeded by an amount corresponding to the pressure level supplied to said pressure chamber 111. On the other hand, when no such hydraulic pressure is supplied to the pressure chamber 111, the piston member 112 is biased by the biasing action of the compression spring 113 in the leftwards direction as seen in the figure, so that the raised circular ribs 112d release the superposed sandwich of the clutch plate sets 21a and 21b, and this causes said clutch plate sets 21a and 21b to be rotationally decoupled from one another, thereby rotationally decoupling the differential casing 82 and the shaft 90 from one another and allowing them to rotate substantially independently; and thereby the central differential device 80 of the four wheel drive power transfer device 62 is allowed to perform differential action without substantial impediment thereof.

Hydraulic fluid pressure of any desired pressure level within a certain range is supplied to the pressure chamber 11 of this hydraulic actuator 110 by the following arrangements. A hydraulic fluid pump 71 picks up hydraulic fluid from a sump of the tranmission system and pressurizes it. This pressurized hydraulic fluid is then supplied to a pressure regulator valve 121 of a per se known sort which regulates its pressure to a determinate line pressure value. This line pressure is then fed to a port designated as "b" of an electromagnetically actuated hydraulic fluid switching valve 122. This electromagnetically actuated hydraulic fluid switching valve 122 is of a per se known type, and has in all three ports, designated as "a", "b", and "c": when actuating electrical energy is supplied to a solenoid or the like (not particularly shown) of said electromagnetically actuated hydraulic fluid switching valve 122, then the port "a" thereof is communicated to the port "b" thereof while the port "c" thereof is communicated to no other port; while, on the other hand, when no such actuating electrical energy is supplied to said solenoid or the like of said electromagnetically actuated hydraulic fluid switching valve 122, then the port "a" thereof is communicated to the port "c" thereof while the port "b" thereof is communicated to no other port. The port "a" of this electromagnetically actuated hydraulic fluid switching valve 122 is communicated to the pressure chamber 111 of the hydraulic actuator 110, while on the other hand the port "c" of said electromagnetically actuated hydraulic fluid switching valve 122 is communicated to a hydraulic fluid drain.

The electromagnetically actuated hydraulic fluid switching valve 122 is supplied, from a transmission control device 130 which will be discussed shortly, with a pulsed electrical signal. According to the duty ratio of this pulsed electrical signal, the ON/OFF duty factor of the electromagnetically actuated hydraulic fluid switching valve 122 is determined. When the pulsed electrical signal is in the ON state, then the port "a" of the electromagnetically actuated hydraulic fluid switching valve 122 is communicated to the port "b" thereof and is thus supplied with hydraulic fluid pressurized to line pressure level, while, on the other hand, when the pulsed electrical signal is in the OFF state, then the port "a" of the electromagnetically actuated hydraulic fluid switching valve 122 is communicated to the port "c" thereof and is thus drained. Therefore, according to the duty ratio of the pulsed electrical signal supplied by the transmission control device 130, the pressure provided in the pressure chamber 111 of the hydraulic actuator 110 can be set to any pressure level between zero and line pressure level, and thereby the degree of rotational coupling together of the differential casing 82 and the shaft 90 of the central differential device 80 of the four wheel drive power transfer device 62 can be controlled to be any value between substantially zero and the substantially full rotational coupling together condition; and thereby the differential action of said central differential device 80 of said four wheel drive power transfer device 62 can be impeded by any amount between substantially zero and substantially the fully impeded condition.

The Hydraulic Clutch 105

There is also provided a front differential control clutch 105, which is a similar type of device to the clutch 100 just described and may be structured similarly and controlled by a similar form of control system: as far as FIG. 5 is concerned, the block symbolizing the electric/hydraulic control device 120 is to be understood as embracing the control systems for both these clutches 100 and 105. This front differential control clutch 105 is provided between the differential casing 92 of the front differential device 91 and the right side front wheel power output shaft 97 thereof, and according to its selective operation by selective supply of actuating hydraulic fluid pressure selectively either locks said members together with regard to mutual rotation thereof, or allows said members to rotate substantially freely with respect to one another. Thus, this front differential control clutch 105 either allows, or inhibits, the operation of the front differential device 91, according to its control by the electric/hydraulic control device 120.

This vehicle power train operates in a manner which will be clear to one of ordinary skill in the art, based upon the discussions in this specification, and hence will not be further explained in view of the desirability of conciseness of explanation.

The Transmission Control System and the Third Preferred Embodiments

The following detectors and sensors are provided to this system (vide FIG. 5). A road speed sensor 131 detects a value representative of the road speed of the vehicle by measuring the rotational speed of the rear wheel power output shaft 88 or of some other rotating member, and outputs an electrical signal representative thereof. A throttle position sensor 132 detects a value representative of the current load on the internal combustion engine 10 by measuring the opening angle of the throttle valve (not particularly shown) of a carburetor (not shown either) of said engine 60, and outputs an electrical signal representative thereof. A set range sensor 133 detects the set position of a manual range setting device such as a range setting valve or the like which is provided for the automatic speed change device 61, and outputs an electrical signal representative thereof. A 4WD transfer device input torque sensor 134 senses the torque that is being supplied as input torque to the four wheel drive power transfer device 62, and outputs an electrical signal representative thereof. And a manually operated 4WD transfer device lock select switch 135 is provided in the passenger compartment of the vehicle so as to be readily accessible to the driver of the vehicle, and can be set to either or two positions, a first position for indicating that the vehicle is to be operated with the four wheel drive power transfer device 62 set to be locked up and not to provide any differential action, and a second position for indicating that the vehicle is to be operated with the four wheel drive power transfer device 62 set to be providing its differential action; this lock select switch 135 outputs an electrical signal representative of its setting. The output signals of these five sensors and switches 131, 132, 133, 134, and 135 are fed to the transmission control device 130.

This transmission control device 130 outputs control signals for controlling the electric/hydraulic control device 120 for the foour wheel drive power transfer device 14 and the front differential device 91, and the electrical/hydraulic control mechanism 70 for the automatic speed change device 64. No concrete illustration of the structure of any particular realization of this transmission control device 130 will be given herein, since various possibilities for the details thereof can be easily supplemented by one of ordinary skill in the electronic art based upon the functional disclosures set out in this specification; typically, said transmission control device 130 is again concretely realized as a micro computer and its associated circuitry, said micro computer operating at the behest of a control program. Functionally, this transmission control device 130 controls the switching over of the automatic speed change device 64 according to preset and prestored patterns, depending upon the setting of the aforementioned manually actuated range setting device for the vehicle, upon the current value of vehicle road speed as detected by the vehicle road speed sensor 131, and upon the current value of engine throttle opening as detected by the throttle position sensor 132. Further, according to the concept of the third preferred embodiments of the anti torque shock control device and method of the present invention, said transmission control device 130, when the set range sensor 133 detects that said aforementioned manually actuated range setting device for the vehicle is manually shifted from a non drive operational mode such as "P" range or "N" range to a drive operational mode such as "D" range, "S" range, "L" range, or "R" range, regardless of the current value of the torque that is being supplied as input torque to the four wheel drive power transfer device 62 as detected by the sensor 134 therefor, and regardless of the current position of the manually operated 4WD transfer device lock select switch 135, sends control signals to the electric/hydraulic control device 120 so as to lock up the clutch 100 for the four wheel drive power transfer device 62 and so as to lock up the front differential control clutch 105. Thereby, the same advantages as described above with regard to the first and second preferred embodiments of the anti torque shock control device and method of the present invention are obtained. And this locking up of the clutches 100 and 105 is maintained over a certain time interval. After this switching over period, i.e. when said transmission control device 130 decides that the manually actuated range setting device for the vehicle has been left manually shifted to a drive operational mode such as "D" range, "S" range, "L" range, or "R" range for at least a determinate time period, then said transmission control device 130 controls the front differential control clutch 105 to be released, and further controls the electric/hydraulic control device 120 so as to control the torque transmission capacity of the clutch 100 for the four wheel drive power transfer device 62 according to the value of the torque that is being supplied as input torque to the four wheel drive power transfer device 62, and according to the setting of the lock select switch 135: but these matters are not strictly related to the present invention.

Thus, also according to this mode of control according to these third preferred embodiments of the anti torque shock control method and device of the present invention, when the operational range of the automatic speed change device 64 is switched from a non drive range such as "P" range or "N" range to a drive range such as "D" or "R" range by the vehicle driver manually actuating the manual setting means therefor and thereby actuating the set range sensor 133 to provide an indication thereof, at this time, for a certain time period and irrespective of the current setting of the manually operated lock select switch 135, the clutches 100 and 105 of the four wheel drive power transfer device 62 and the front differential device 91 are definitely engaged, so as at least for this short time period to definitely provide, in particular, no differential action between the two front wheels of the vehicle, as well as no differential action between the front wheels of the vehicle and the rear wheels of the vehicle; and both of these actions help with preventing the occurrence of any large drive train torque shock upon this shifting of the operational range of the automatic speed change device 2 from a non drive range such as "P" range or "N" range to a drive range such as "D" or "R" range. Accordingly, as before, the reliability and the life span of the drive train as a whole of the vehicle are desirably extended, and furthermore the emission of any unpleasant noise such as "clonking", from either of the four wheel drive power transfer device 62 and the front differential device 91, during this engagement of a transmission drive range from a non drive range, is positively avoided.

The Fourth Preferred Embodiments

Figure 7:
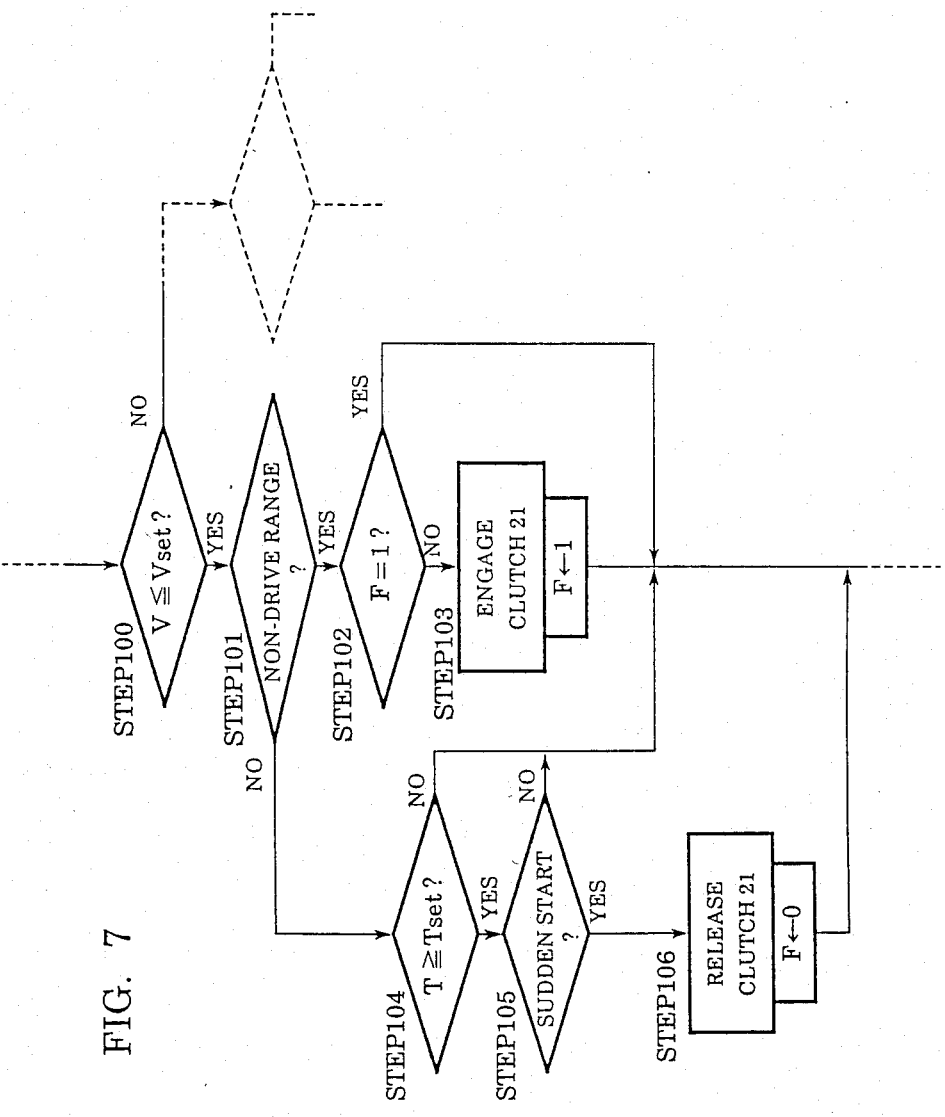
FIG. 7, which is similar to FIG. 3 for the first preferred embodiments, is a partial flow chart for illustrating an anti torque shock control portion of a program obeyed by a micro computer incorporated in the control system of FIG. 4, to realize the fourth preferred embodiments of the anti torque shock control device and method of the present invention, said program portion being executed at regular and frequent intervals.

Next, in FIG. 7, a fragmentary flow chart is shown for a portion of the aforementioned control program which directs the operation of the transmission control device 35 of the second exemplary power train shown in FIG. 4, according to the fourth preferred embodiment of the anti torque shock control method of the present invention, so as to realize the fourth preferred embodiment of the anti torque shock control device of the present invention. This flow chart will now be explained. Again, it shoould be understood that the transmission control device 35 generally functions so as to engage an appropriate one of the various speed stages of the gear transmission mechanism 7 of the transmission mechanism 2 according to the current values of various vehicle operating parameters such as the vehicle road speed as sensed by the vehicle road speed sensor 36, the engine load (throttle opening) as sensed by the throttle position sensor 37, and the operating range of the transmission as manually set by the vehicle driver on the setting means therefor as sensed by the set range sensor 38, typically in a per se conventional way. Thus, again, the flow chart of FIG. 7 only shows the portion of the control program of the transmission control device 35 which controls the clutch 50 of the four wheel drive power transfer device 3. This program portion is again executed at regular intervals of for example a few milliseconds, of course after the engine 1 is started as the four wheel drive vehicle incorporating it is driven. In summary: when the selected range for the operation of the automatic speed change device 2, as indicated by the set range sensor 38, is a drive range, i.e. typically is the "D" range, the "S" range, the "L" range, or the "R" range, then this transmission control device 35 controls the supply of actuating electrical energy to the electric/hydraulic control device 22 to be ON or OFF, so as to control the clutch 21 to be engaged or disengaged, according respectively as to whether or not the manually operated center differential device lock/unlock switch 39 is switched to its position indicating four wheel drive operation without central differential effect, or to its position indicating four wheel drive operation with central differential effect; with the added feature, particularly according to the concept of the present invention, that said transmission control device 35 controls the supply of actuating electrical energy to said electric/hydraulic control device 22 to be ON, so as definitely to lock up said clutch 21, irrespective of the setting of said manually operated center differential device lock/unlock switch 39, while the selected range for the operation of the automatic speed change device 2, as indicated by the set range sensor 38, is a non drive range, i.e typically is the "P" range or the "N" range, and also for a certain determinate time period after said selected range for the operation of the automatic speed change device 2 has altered from being a non drive range such as typically the "P" range or the "N" range, to being a drive range such as typically the "D" range, the "S" range, the "L" range, or the "R" range; but, if the vehicle is being suddenly started, immediately releases said central differential device clutch 21.

Thus, in this anti torque shock control routine, at its beginning in its first decision step 100, said micro processor makes a decision as to whether or not the current value of vehicle road speed, as indicated by the road speed sensor 36, is less than a determinate road speed value Vset, which is set to be a very low value, so that, effectively, this decision step 100 tests as to whether or not the vehicle is substantially at rest. If the answer to this decision is YES, so that in fact the current value of vehicle road speed is less than said determinate road speed value Vset and the vehicle is substantially at rest, then next the flow of control passes to the decision step 101. On the other hand, if the answer to this decision is NO, so that in fact the current value of vehicle road speed is greater than said determinate road speed value Vset and thus the vehicle is not substantially at rest, then next the flow of control passes to leave this program portion, without doing anything further; and the control steps according to the present invention are not applied.

In this next decision step 101, a decision is made as to whether or not the currently set range for the automatic speed change device 2, as determined from the output signal of the set range sensor 38 therefor, is a non drive operational range, or not. Typically, as mentioned above, such a non drive range will be either the "P" range or the "N" range. If the answer to this decision is YES, so that in fact the currently engaged operational range for said automatic speed change device 2 is a non drive operational range, then next the flow of control passes to the decision step 102. On the other hand, if the answer to this decision is NO, so that in fact the currently engaged operational range for said automatic speed change device 2 is not a non drive operational range and hence must be a drive operational range such as "D" range, "S" range, "L" range, or "R" range (for example), then next the flow of control passes to the decision step 104.

In the decision step 102, at which program point it has been established that the vehicle is substantially at rest and the automatic speed change device 2 is being operated in a non drive range, a test is made as to whether or not the current value of a flag F is unity. If the answer to this decision is YES, so that currently F=1, then the flow of control skips to pass next out of this program portion, without doing anything further; but, if the answer to this decision is NO, so that the value of F is not currently 1, then next the flow of control passes to the step 103.

In this step 103, the micro processor outputs an appropriate control signal to the electric/hydraulic control device 22 to ensure that the clutch 21 of the four wheel drive power transfer device 3 is engaged. Thus four wheel drive operation without any central differential effect is provided, and both the rear wheels of the vehicle and also the front wheels of the vehicle are independently connected to any output power which may be being provided from the automatic speed change device 2, with the torque being distributed between the front vehicle wheels and the rear vehicle wheels according to the current values of the loads on the front and the rear vehicle axles, so that the torque distribution ratio is substantially equal or 50:50. And then the value of the flag F is set to unity, and next the flow of control passes to leave this routine, without doing anything further.

On the other hand, if the currently set range for the automatic speed change device 2, as determined in the decision step 101 from the output signal of the set range sensor 38 therefor, is not a non drive operational range, then next, in the decision step 104, the micro processor makes a decision as to whether or not the time interval currently counted by a timer since executing this step 104 has exceeded a certain determinate time interval Tset, for example about two seconds or so. If the answer to this decision is YES, so that in fact the elapsed timed itnerval has indeed exceeded said determinate time interval Tset, then next the flow of control passes to the decision step 105. On the other hand, if the answer to this decision is NO, so that in fact the elapsed timed interval has not yet exceeded said determinate time interval Tset, then next the flow of control passes to leave this program fragment, without doing anything further.

Next, in this decision step 105, at which point it is determined that the determinate time interval Tset has in fact been timed by the timer, a test is made as to whether or not the vehicle is performing a sudden start off from rest. This test may be performed by considering, for example, the rate of change of the the throttle opening of the vehicle engine. If a sudden start is not being performed, then the flow of control passes next to leave this program fragment without doing anything further, and the engagement of the clutch 21 is continued. On the other hand, if a sudden start is being performed, bearing in mind the extra load on the rear vehicle wheels, in the step 106 the micro processor outputs an appropriate control signal to the electric/hydraulic control device 22 to ensure that the clutch 21 of the four wheel drive power transfer device 3 is immediately disengaged. Thus operation with central differential device differential effect in force is provided. Also the value of the flag F is set to zero. And then next the flow of control passes to leave this program fragment, without doing anything further.

And, by the repetition of the FIG. 7 program in a relatively tight and quick cycle with a period of the order of milliseconds, the control of the clutch 21 of the four wheel drive power transfer device 3 is maintained.

Thus, according to this mode of control according to these fourth preferred embodiments of the anti torque shock control method and device of the present invention, when the operational range of the automatic speed change device 2 is switched from a non drive range such as "P" range or "N" range to a drive range such as "D" or "R" range by the vehicle driver manually actuating the manual setting means therefor and thereby actuating the set range sensor 38 to provide an indication thereof, at this time, for the certain time period Tset and irrespective of the current setting of the center differential lock/unlock switch 39, the clutch 21 of the four wheel drive power transfer device 3 is definitely engaged, so as at least for this short time period Tset to definitely provide operation of the vehicle without any central differential action; and this prevents the occurrence of any large drive train torque shock upon this shifting of the operational range of the automatic speed change device 2 from a non drive range such as "P" range or "N" range to a drive range such as "D" or "R" range. Accordingly, the reliability and the life span of the drive train as a whole of the vehicle are desirably extended. Furthermore, the emission of any unpleasant noise such as "clonking" during this engagement of a transmission drive range from a non drive range is positively avoided, and further vehicle squat during such an operation, which might occur if two wheel drive operational mode of the vehicle were being provided at this time due to the powering up of the rear wheels of the vehicle while the front vehicle wheels were not powered up, is definitely prevented. However, during sudden starting off of the vehicle, this central differential clutch 21 is released immediately, whereby the differential action of the central differential device 3 is resumed, and the front to rear torque distribution provided thereby is determined according to the distribution ratio provided by the central differential device 10, and this action is appropriate for sudden starting off, because typically the rear vehicle wheels will receive more torque than the front vehicle wheels.

The Fifth Preferred Embodiments

Figure 8:
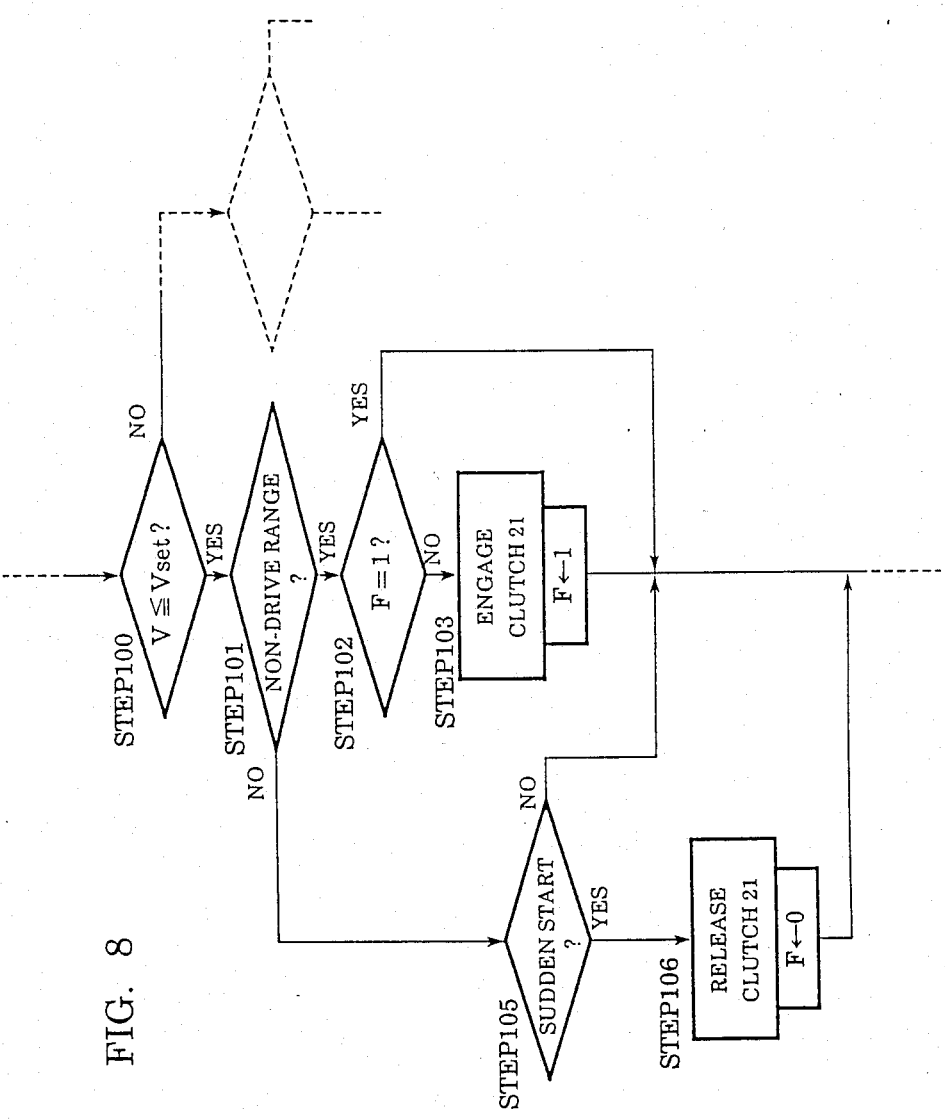
FIG. 8, which is similar to FIG. 7 for the fourth preferred embodiments, is a partial flow chart for illustrating an anti torque shock control portion of a program obeyed by a micro computer incorporated in the control system of FIG. 4, to realize the fifth preferred embodiments of the anti torque shock control device and method of the present invention, said program portion again being executed at regular and frequent intervals.

It might happen that the sudden starting off of the vehicle from substantial rest might occur at the same time as the shifting of the operational range of the automatic speed change device 2 from a non drive range to a drive range. In such a case, when it is necessary to concentrate upon the starting off characteristics and to release the differential clutch immediately, then the step 104 shown in the FIG. 7 flow chart may be omitted, and the engagement and disengagement of the clutch 21 may be performed as shown in the FIG. 8 flow chart, which illustrates the operation of the fifth preferred embodiments of the anti torque shock control device and method of the present invention. Full details of this flow chart and of these fifth preferred embodiments will be omitted, since they will be clear to one of ordinary skill in the art based upon the above disclosures.

Conclusion

In order to reduce the vehicle squat phenomenon, it is optimal for the engagement of the differential control clutch 21 to be substantially complete, as in the last two embodiments detailed above, so that the front vehicle wheels and the rear vehicle wheels should be directly connected together; but, if the clutch 21 is not completely engaged but is only partially engaged, so that some slippage thereof still occurs, then even so the differential effect of the central differential device 10 will be impeded although it will not be completely prevented, and thus the torque distribution between the front vehicle wheels and the rear vehicle wheels will approach equality, so that the vehicle squat reduction effect will still be present. Therefore, when the operational range of the automatic speed change device 2 is switched from a non drive range to a drive range, it is sufficient for the clutch 21 to be only partially engaged, and it is not necessary for said clutch 21 to be fully engaged.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a power transmission system for a vehicle comprising a pair of front and a pair of rear wheels, a transmission mechanism, and a selectively engagable clutch for being selectively at least partially engaged for controlling said vehicle between two wheel drive operation and four wheel drive operation;

an anti torque shock control device, comprising:
(a) a first means for detecting whether or not shift range of said transmission mechanism is a vehicle non driving range or a vehicle driving range; and
(b) a second means for controlling said clutch to be at least partially engaged, when shift range of said transmission mechanism, as detected by said first means, alters from a vehicle non driving range to a vehicle driving range.

2. An anti torque shock control device according to claim 1, further comprising a third means for detecting a rapid vehicle start and for modifying operation of said second means so as not to engage said clutch during said rapid vehicle start.

3. For a four wheel drive power transmission system for a vehicle comprising a pair of front and a pair of rear wheels, a transmission mechanism, and a selectively engagable clutch for being selectively at least partially engaged for controlling said vehicle between two wheel drive operation and four wheel drive operation;

an anti torque shock control method, wherein:
(a) it is detected whether or not shift range of said transmission mechanism is a vehicle non driving range or a vehicle driving range; and
(b) said clutch is controlled to be at least partially engaged, when shift range of said transmission mechanism, as thus detected, alters from said vehicle non driving range to said vehicle driving range.

4. An anti torque shock control method according to claim 3, wherein said clutch is not engaged when said vehicle is started rapidly even when shift range of said transmission mechanism alters from said vehicle non driving range to said vehicle driving range.

* * * * *